United States Patent
Thompson

Patent Number: 5,865,470
Date of Patent: Feb. 2, 1999

[54] PEEL OFF COUPON REDEMPTION CARD WITH MICROPROCESSOR CHIP AND TRACKING SYSTEM

[76] Inventor: Kenneth Thompson, 2368 Eastman Ave., Ste. 3, Ventura, Calif. 93003

[21] Appl. No.: 621,484

[22] Filed: Mar. 25, 1996

Related U.S. Application Data

[63] Continuation-in-part of Ser. No. 237,503, May 2, 1994, Pat. No. 5,501,491, which is a continuation-in-part of Ser. No. 18,762, Feb. 15, 1994, which is a continuation-in-part of Ser. No. 884,962, May 15, 1992, Pat. No. 5,308,120, which is a continuation-in-part of Ser. No. 881,542, May 12, 1992, Pat. No. Des. 343,332.

[51] Int. Cl.$^6$ .................................................. B42D 15/00
[52] U.S. Cl. .............................................. 283/70; 283/51
[58] Field of Search ................................ 283/70, 67, 51, 283/81, 101, 105, 56, 115

[56] References Cited

U.S. PATENT DOCUMENTS

| | | | |
|---|---|---|---|
| 5,298,731 | 3/1994 | Ett | 283/70 |
| 5,308,120 | 5/1994 | Thompson | 283/70 |
| 5,501,491 | 3/1996 | Thompson | 283/70 |

Primary Examiner—Willmon Fridie, Jr.
Attorney, Agent, or Firm—Richard D. Slehofer

[57] ABSTRACT

A coupon redemption card and tracking system includes a credit card size redemption coupon card used by the customer, and a tracking sheet used by the redemption center such as a restaurant. The redemption card has a plurality of mini coupons, which can be peeled off individually. Each redeemed coupon is affixed to a tracking sheet. The tracking system facilitates the accounting and inventory of redeemed coupons. The coupon card is formed as two laminated layers of special paper joined together by a layer of adhesive material, and a layer of clear plastic film on the top face of the card. The base layer is fabricated from a special paper. An adhesive coating is applied to one side of the base layer. The peel off coupon layer is affixed to the adhesive coating. The finished layered sheet is printed on both sides, die-cut on the coupon side, and then laminated with the film on the other side. Each coupon that is removed from the card has adhesive to adhere the coupon to the tracking sheet. The small size of the mini coupons is convenient for the card holder and the redemption center. The system can be used wherever one has to keep track of various redeemable coupons. A memory chip or a microprocessor chip is adhered to the card to form a memory smart card. The microprocessor chip is programmed to contain information about the card so that a chip reader can read the information about the card.

54 Claims, 18 Drawing Sheets

SUPER DISCOUNT CARD
Keep track of Redemptions
Peel Off Coupons & Place On This Card Date _____ Location _____
Reg. _____ Shift _____
Place The Total Amount Of
Cash Sale and Coupon Here

| $ | $ | $ |
|---|---|---|
| $ | $ | $ |
| $ | $ | $ |
| $ | $ | $ |

TOTAL REGISTER SALES  $ _____

LESS VALUE OF COUPONS  $ _____

EQUALS TOTAL ADD ONS  $ _____

A. Liner approximately .007"
B. Removable release liner
C. Top stamp or coupon

Bar code tracking
on E Stamp or coupon 3M 315 84 98011 4811
High coercivity transfer (mag.) tape
made to cover paper Use as regular coupon

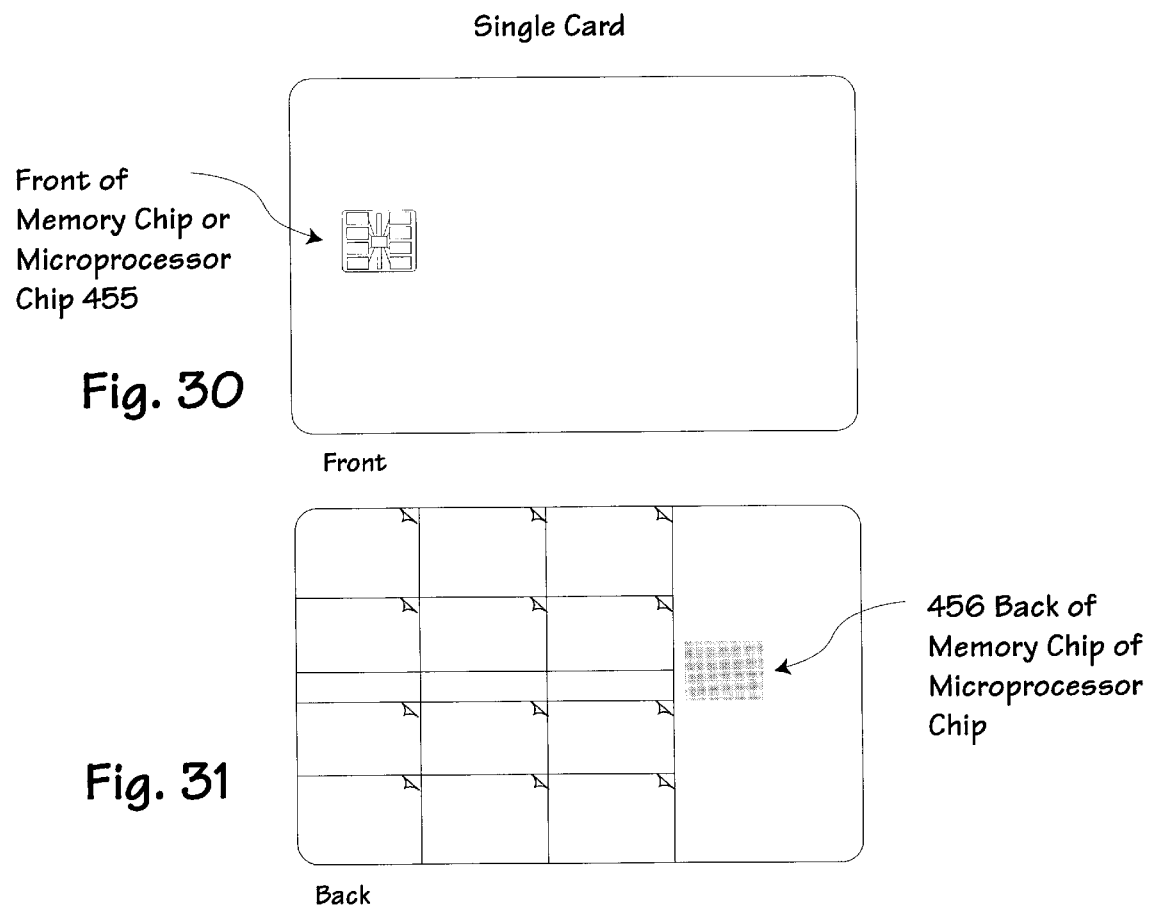

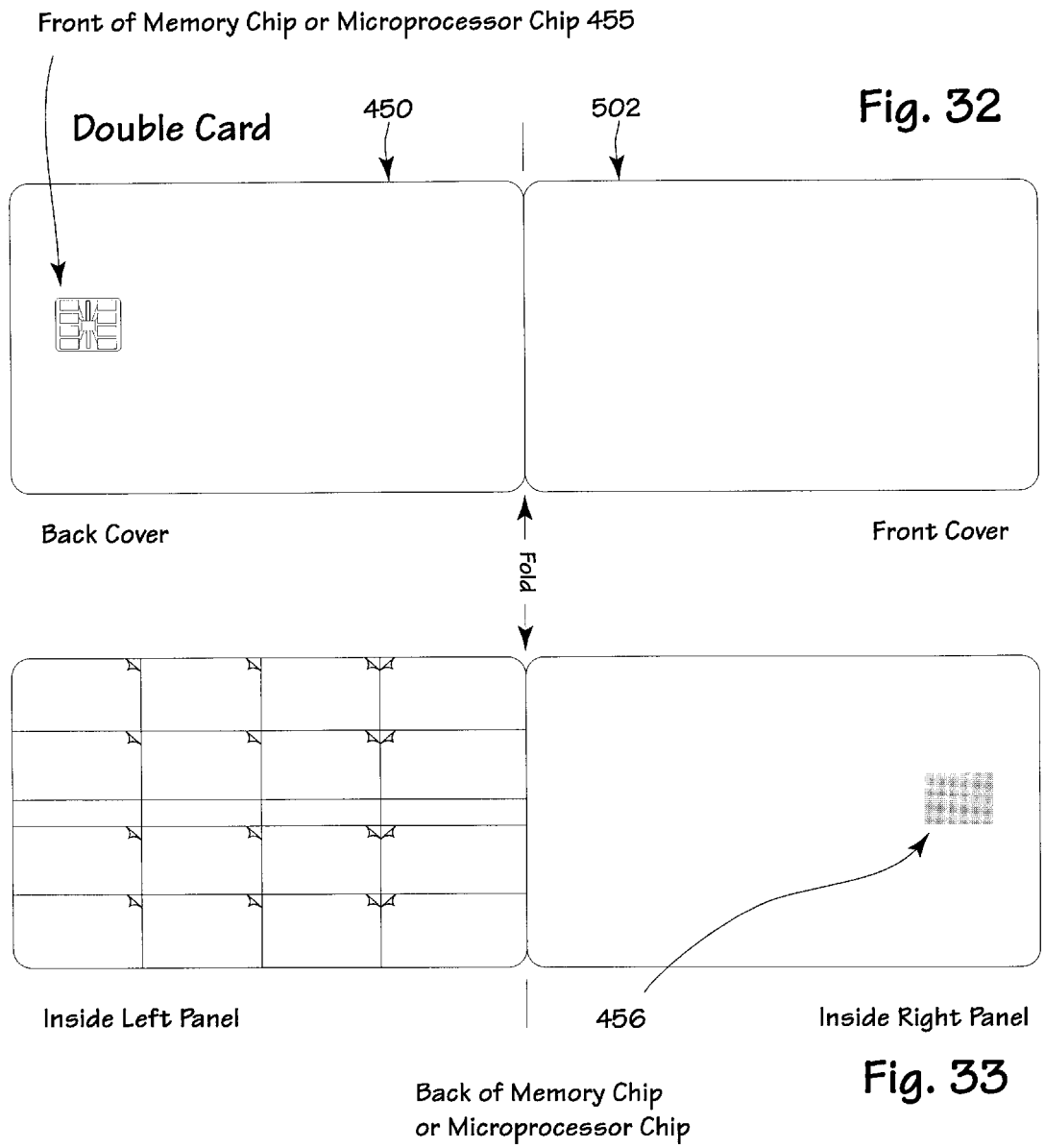

For Private Use and Security

General Purpose General Use

For Private Use and Security

For Private Use and Security

Single Card

Front of Memory Chip or Microprocessor Chip

Magnetic Strip

Front

Back

Back of Memory Chip or Microprocessor Chip

PEEL OFF COUPON REDEMPTION CARD WITH MICROPROCESSOR CHIP AND TRACKING SYSTEM

CROSS REFERENCES TO RELATED APPLICATIONS

This is a continuation-in-part application of application No. 08/237,503 filed on Mar. 26, 1996, now U.S. Pat. No. 5,501,491, which is a continuation-in-part of application Ser. No. 07/884,962 filed on May 15, 1992, now U.S. Pat. No. 5,308,120, which is a continuation-in-part of application Ser. No. 07/881,542 filed on May 12, 1992 and which is currently U.S. Pat. No. Des. 343,332. The present application is also a continuation-in-part application of application Ser. No. 29/018,762 filed on Feb. 15, 1994 and which is still currently pending.

BACKGROUND OF THE INVENTION

1. Field of the Invention

The present invention pertains to the following areas of technology:
PRINTED MATTER—a label;
PRINTED MATTER—having revealable concealed information, fraud preventer or detector, use preventer or detector, or identifier by removable material that is adhesively attached;
PRINTED MATTER—Advertising;
CHEMISTRY—adhesive coatings on sheets and products.

2. Description of the Prior Art

Cents-off coupons and other types of discount coupons are well know to grocery shoppers. Local newspapers print various grocery item coupons, which will be honored by most major supermarket chains. Coupons are also published in magazines, and are frequently mailed to households in mass mailings. The retail establishments that accept and honor these coupon then have to collate the coupons, and forward them to the manufacturer for reimbursement plus handling costs. Coupons come in various shapes, sizes and condition. The cashier accepts the coupons as they are presented to her at the check out line at a supermarket. The accepted coupons then have to be sorted and processed, which is very time consuming to the supermarket. It takes time for the cashier to read each coupon, credit the customer's cash register receipt for the amount stated on each coupon, and also ensure that the customer has purchased the product stated on the coupon. The cashier then places the redeemed coupons in a special drawer for sorting later.

Redemption stamps and stamp booklets also are well known in the art. Green Stamps were popular in the 1950's. Participating retail stores would display a decal or sign indicating that they would issue Green Stamps. Whenever a customer purchased goods at the store, the store would issue to the customer a quantity of Green Stamps, which would usually be based upon the purchase price of the goods. The Green Stamps were similar to postage stamps and had a glued backing that only had to be moistened to activate the adhesive ability of the stamps. The customer was supplied with Green Stamp redemption booklets, which contained a fixed number of blank pages for gluing the Green Stamps thereto. The object was to fill up several booklets with Green Stamps. The full booklets then could be redeemed at a Green Stamp redemption center. The redemption center would give the redeemer free goods in exchange for a certain number of booklets filled with Green Stamps. The system was funded by the retail stores, which purchased the Green Stamps from the redemption center. The participating stores believed that issuing Green Stamps increased their business, because customers would prefer to shop at a store that issued Green Stamps over a store that did not.

Memory smart cards are known in the art. A company called SOLAIC with headquarters in Paris, France provides smart cards throughout Europe. A smart card is a credit card size plastic card with a memory chip or a microprocessor chip adhered to one side of the smart card. A microprocessor chip is also known as an integrated circuit chip, which is called an IC chip for short. IC chips find wide application in the computer industry. SOLAIC sells a type of microprocessor chip called the Eurochip. It has 221 bits of EEPROM with secured counting logic. SOLAIC also sells other types of microprocessor chips. A microprocessor chip functions like a ram chip. It can be reprogrammed. A memory chip is available from SOLAIC, which it calls the 256 memory chip. The 256 chip has 256 bits non erasable in PROM.

A smart card is used as a simple token prepaid card and up to the most sophisticated payment card. The smart card with a memory chip is widely used in Europe. It is used as a prepaid telephone card, or as a token to ride the subways, buses, or trains. Equipment is available to read these smart cards. For example, the user buys a $100 prepaid telephone card with a memory chip. The chip is programmed so that a telephone with the proper equipment will accept the smart card as payment for a telephone call and will automatically read the amount of money left on the chip and afterward will electronically deduct the amount of the call. After the $100 in telephone calls are paid for by the smart card, the user buys another smart card. It replaces the need to carry cash or a conventional credit card. If the smart card is lost, the buyer cannot get a refund, and the finder can use the card. Fortunately, the buyer only loses the amount left on the card. If the buyer were to lose his credit card, then he would have to cancel his card and worry about the finder of the credit card making fraudulent purchases with the card up to the credit limit of the card. The smart card can also be used to pay tolls on the subway and bus. The buyer buys $100 worth of tolls on the smart card. Every time he needs to ride the bus or the subway, he slips the smart card into the electronic reader previously installed to accept smart cards. The toll or the fare is electronically deducted from the $100 memory chip on the smart card. An electronic reader tells the holder how much money is still left on the card. If the buyer loses the smart card, then the finder can use the card. The card is the equivalent of cash for the toll or fare.

The memory smart card with a microprocessor chip can be used as a debit card in conjunction with an ATM machine. The owner of the card slips it into the ATM machine at his bank. The owner instructs the ATM machine to electronically enter $100 on the microprocessor chip on the smart card, and deduct $100 from the owner's bank account. The owner then uses the card as he would the memory chip smart card. The owner can also use the card to make purchases at retail establishments. Retailers prefer the smart card because the transaction is the equivalent of cash. The transaction cannot be voided later. Even if the smart card is lost the owner cannot stop the finder from using up the balance left on the smart card. As previously stated, the owner loses only the balance left on the smart card, but he does not have to cancel his lost credit card and then worry about fraudulent charges on his lost card. The retailer does not have to worry about accepting a credit car charge that may be uncollectible because the charge was made with a stolen credit card or lost credit card, or because the credit card account has been cancelled by the bank. After the $100 has been spent, the card holder returns to the ATM and replenishes the balance on the smart card from his bank account. The card holder can transfer variable amounts of cash to the smart card. The card holder can also have more than one smart card.

The credit card size plastic card which forms the smart card functions only as a vehicle to hold the memory chip or IC chip. The machines developed to read the smart card require that the smart card be a standard size, that the chip be adhered to the card at a certain location, and that the face of the chip be exposed so that the machine can read the chip. Smart cards can have printing on them to show that they are a phone card, or that they will be honored by various transit authorities. The readers are interconnected to computers so that the transaction is automatically deducted from the account which sold the smart card. The smart card is very convenient for the commuter. The same card can be used to pay for bus fare, to make small purchases, and to make phone calls at pay phones.

A smart card is similar to a credit card. Conventional credit cards are a standard size, and have an exposed magnetic strip adhered at a certain location on the card so that a magnetic strip reader can read the magnetic strip. The card has to be placed in a certain configuration in the reader before the reader can read the magnetic strip.

SUMMARY AND OPERATION OF THE INVENTION

A coupon redemption card and tracking system includes a credit card size redemption coupon card used by the customer, and a tracking sheet used by the redemption center such as a restaurant. The redemption card has a plurality of mini coupons, which can be peeled off individually. Each redeemed peel off coupon is affixed to the tracking sheet, which has dimensions of a dollar bill so that the sheet can be placed conveniently in the till of a cash register. The tracking system facilitates the accounting and inventory of redeemed coupons.

The coupon card is fabricated from two laminated layers of paper or paper-like material, a clear plastic protective film, and an adhesive coating. The base layer is fabricated from a special paper. An adhesive layer is applied to one side of the base layer. The layer, which will form the peel off coupon layer, is then affixed to the layer of adhesive material. The finished two layered sheet is held together by adhesive material. The layered sheet is produced as a large single sheet or as roll of the material. The sheet or roll is then sent to the printer. The printer applies printer's ink to both sides of the sheet to form the desired printed matter on both sides of the sheet. After the printer's ink transfer process has been completed, the top side of the sheet has the requested identification or advertising matter printed on it. The bottom side has the requested individual coupons printed on it. The next step is to have the top surface laminated with a clear plastic film for durability, protection, and to provide a pleasing appearance. This clear protective film lamination process can take place immediately after the inking process. It must be done afterwards to protect the previously applied printer's ink. The laminated sheets are then die-cut on the coupon side. When the individual coupon is removed from the card, it has sufficient adhesive so that it will adhere to the tracking sheet. The small size of the mini coupons is convenient for the card holder and it is also convenient for the redemption center. It eliminates the need to process diverse sizes and shapes of customer coupons. The system can be used wherever one has to keep track of various redeemable coupons and the like.

The present invention is preferably used for fund raising by charitable organizations that have youngsters as members. Such organizations include the Little League, Boy Scouts, Girl Scouts, and the Y.M.C.A. Initially various fast food restaurants are contacted in a given geographic area to ask if they would participate in the fund raising drive. The fast food restaurants are asked to redeem the coupons submitted by the customer. The fast food restaurant absorbs the costs. The fast food restaurant benefits by attracting new customers, keeping customer loyalty, and increasing its good will in the community. The coupon cards are fabricated and sold to the charitable organization for a fee. The charitable organization then sells the cards to the public for a higher fee. The difference between the cost and the price sold to the public is the profit made by the organization. The money goes to fund the charitable or non-profit organization. There is no overhead involved, because the cards are sold by the members. The coupon card usually has a legend printed on it to let the customer know which restaurants will honor the coupons. The coupon system also eliminates employee theft at the restaurant. It prevents a sales clerk from selling an item of food, pocketing the money, and then telling the manager that he or she gave away the item of food. Any food items given away would have to be evidenced by the redeemed coupon affixed to the tracking sheet in the clerk's till. When the coupon is redeemed, the clerk affixes the coupon to a blank square on the tracking sheet and then writes in the amount that would normally be charged for that food item as if the customer had paid for the item of food. The tracking sheets are also acceptable evidence by the Internal Revenue Service to show a legitimate tax deduction by the restaurant. There are three parties involved in the promotion: the fast food restaurant, the coupon card distributor, and the non-profit organization. This three party arrangement is required by the I.R.S. before the restaurant can take the full deduction as a legitimate business expense. The completed tracking sheets already have the prices written in by the clerks. All of the prices on the tracking sheets are tallied by the accountant. The total amount is allowed by the I.R.S. as a deduction. Other types of promotional arrangements result in only a partial deduction by the I.R.S. of the actual costs incurred by the fast food restaurant. It is also useful when the franchisee calculates the royalties due to the franchisor, which are usually based on gross sales.

The thickness of the coupon card is 0.0177 to 0.019 inches. Conventional plastic credit cards are 0.021 to 0.027 inches in thickness. This is a standard thickness so that the plastic credit cards can be used in a machine that accepts plastic credit cards. All machines are designed to accept only this range of thicknesses for a plastic credit card. The present invention cannot be used in a credit card machine, because it is too thin. This prevents misuse of the coupon card by those who might try to use the card at a bank teller machine for example.

A single redemption card has an IC, memory, or microprocessor chip. The single card is similar or identical to the coupon cards in this specification. A company called SOLAIC with headquarters in Paris, France provides memory chips or microprocessor chips which can be adhered to one side of the card. A microprocessor chip is also known as an integrated circuit chip, which is called an IC chip for short. IC chips find wide application in the computer industry. SOLAIC sells a type of microprocessor chip called the Eurochip. It has 221 bits of EEPROM with secured counting logic. SOLAIC also sells other types of microprocessor chips. A microprocessor chip functions like a ram chip. It can be reprogrammed. A memory chip is available from SOLAIC, which it calls the 256 memory chip. The 256 chip has 256 bits non erasable in PROM. These chips are used to make smart cards. Smart cards and their applications are discussed in the Background of the Invention, supra.

After the redemption card has been fabricated, a memory chip or a microprocessor chip such as a SOLAIC chip can be adhered to either side of the face of the card.

BRIEF DESCRIPTION OF THE DRAWINGS

FIG. 14 is a top plan view of a second alternate tracking sheet where each redeemed peel-off coupon from the card can be affixed thereto.

FIG. 20 is a top plan view of a complementary pair of foldable immunization tracking coupon cards having bar codes imprinted on each mini coupon, and is illustrated in the unfolded position.

FIG. 30 illustrates the front of a coupon redemption with a memory chip or a microprocessor chip adhered to the card.

FIG. 31 is the back or coupon side of the card shown in FIG. 30 and back of the electronic chip.

FIG. 32 illustrates a double-flap card in the open position.

FIG. 33 illustrates the other side of the double-flap of card in FIG. 32.

DETAILED DESCRIPTION OF THE PREFERRED EMBODIMENT

Figure 1:
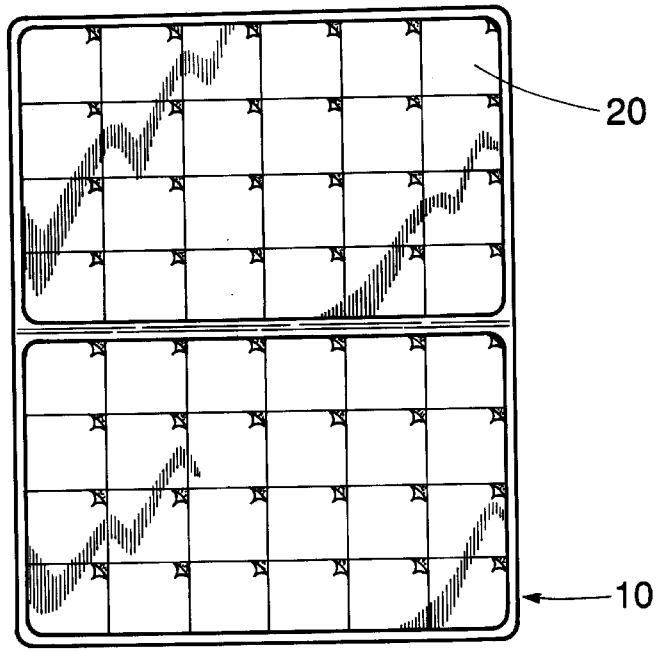
FIG. 1 is a top plan view of a pair of folded peel-off redemption coupon cards, which are illustrated in the unfolded position.
Figure 2:
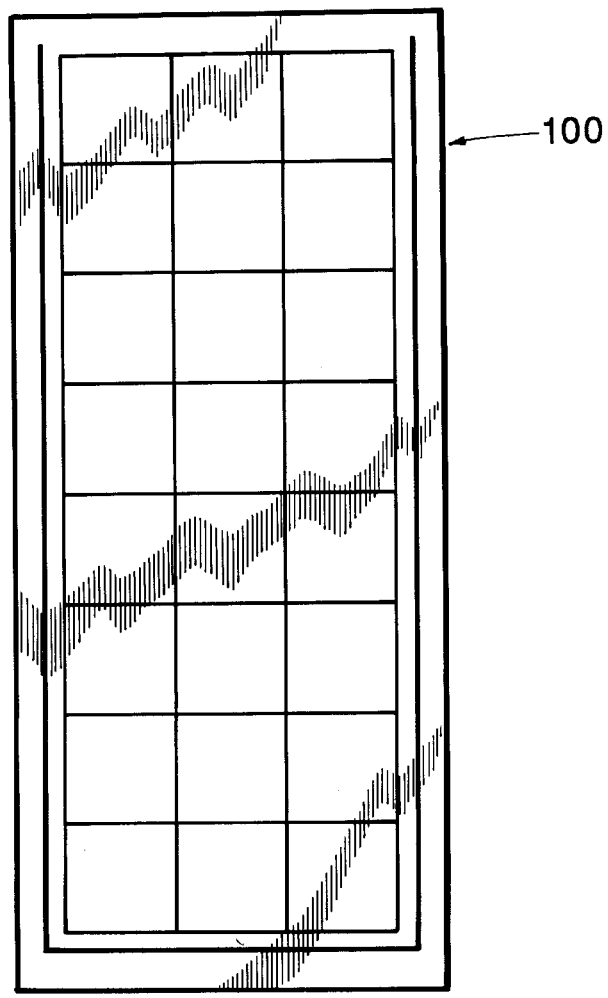
FIG. 2 is the tracking sheet where each redeemed peel-off coupon from the card can be affixed thereto.
Figure 3:
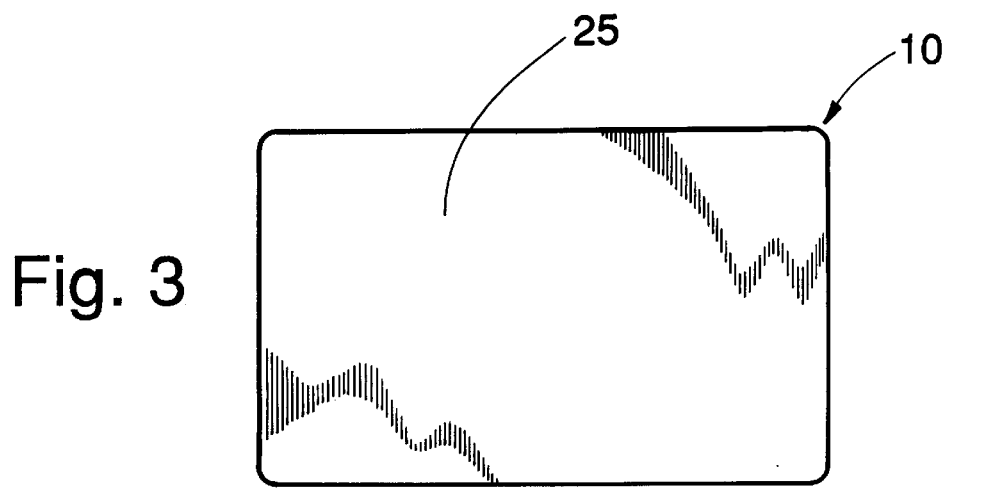
FIG. 3 is a bottom plan view of a credit card size peel-off coupon card.
Figure 4:
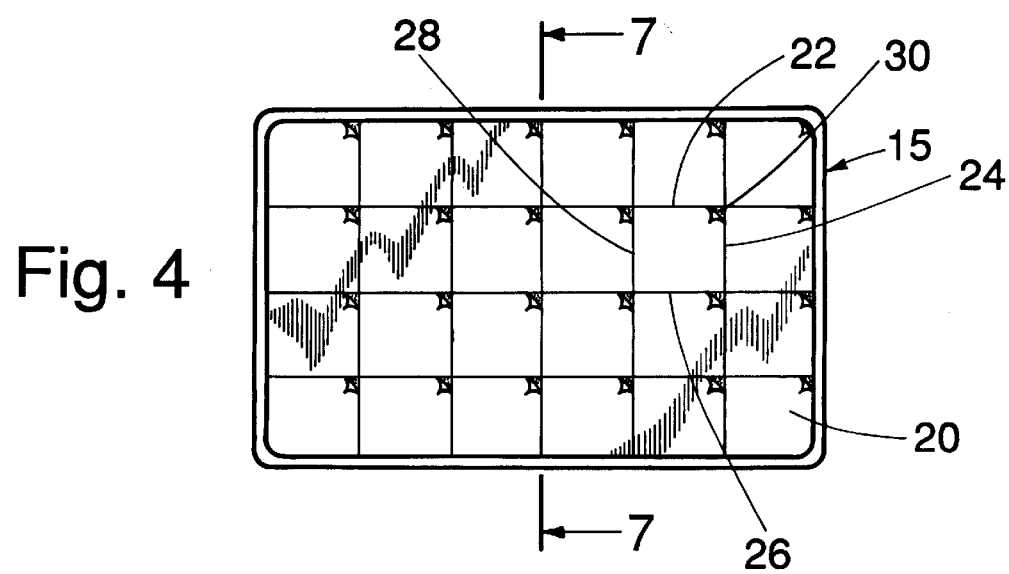
FIG. 4 is top plan view of FIG. 3.
Figure 5:
FIG. 5 is a front elevational view of FIG. 3, the back being identical.
Figures 6, 7:
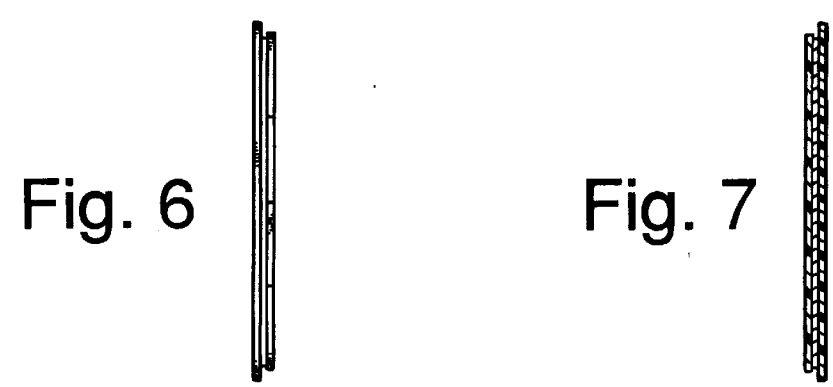
FIG. 6 is a left side elevational view of FIG. 3, the right side being identical.
FIG. 7 is a sectional view taken along the line 7—7 in FIG. 4.
Figure 9:
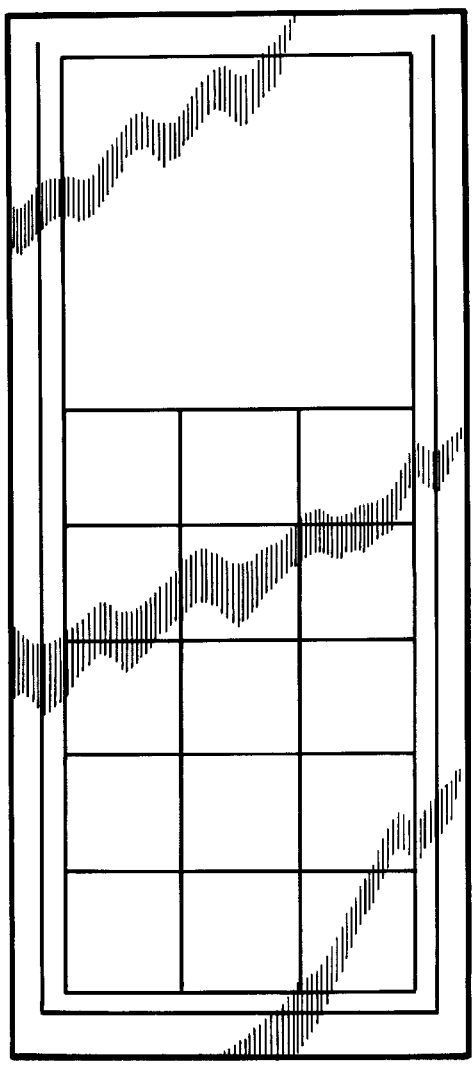
FIG. 9 is a top plan view of the alternate embodiment of the tracking sheet shown in FIG. 2.
Figure 10:
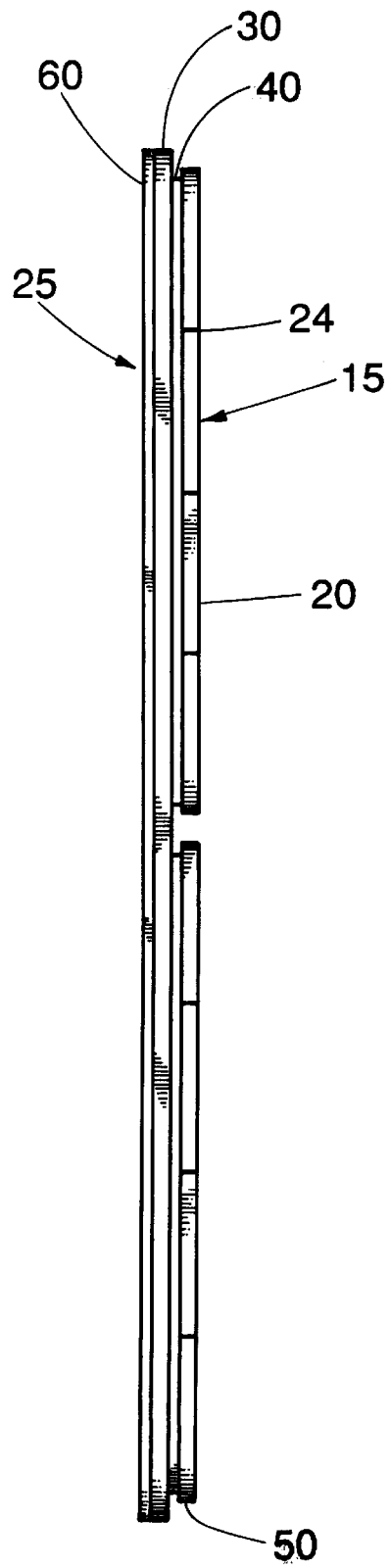
FIG. 10 is an enlarged left side elevational view of the coupon card shown in FIG. 1 clearly showing the layers of material forming the folded pair of coupon redemption cards.

Referring now to the drawings, the present invention includes two major components. The first component is referred to as the peel-off coupon redemption card 10. The single card is illustrated in FIGS. 3–7 and 11–12. The second component is referred to as the tracking sheet 100. The tracking sheet is illustrated in FIGS. 2, 9 and 13. The tracking sheet illustrated in FIG. 13 is 6"×2½". The single coupon redemption card 10 is a credit card size, which can easily fit into the card holder of a user's wallet. The card 10 is thin, flat and has dimensions of 3⅜"×2⅛". The four corners of the card are rounded. The coupon card is thinner than a plastic credit card. The coupon card is 0.0175 to 0.019 inches in thickness. Other than the thickness, it is identical in size to a typical plastic credit card such as a bank card or an oil company credit card. The back face 15 of the card 10 contains a plurality of small mini coupons. FIGS. 4 and 12 illustrate the back side of the card with the peel off mini coupons. Preferably the redemption card has sixteen mini peel off coupons 20 secured to it. Each coupon is scored at any adjoining edges 22, 24, 26 and 28 by a die-cut process so that one can peel away a corner of the coupon with one's finger nail and then can easily remove that particular coupon. A "dog ear" marking 30 is illustrated at one corner of each coupon to visually indicate to the user where to begin the peeling process. The mini coupons do not have the "dog ear" 30 portion already exposed. It is foreseeable that a pull tab or string of some type could be integrated with the coupon to assist in the coupon removal process. The underside of the coupon 20 has an adhesive backing to hold the coupon in place. Each coupon on the coupon card has printed matter printed thereon when the coupon card is fabricated. In the preferred embodiment, the printed matter on each coupon card is for a cash price discount or a buy one-get one free meal at a fast food type of restaurant. This type of coupon card is illustrated in FIG. 12. FIG. 12 illustrates coupons for several different fast food restaurants to allow the card holders flexibility in their selections on where and what kinds of food to eat, because the participating restaurants printed on the coupons will honor the card. The card holders tell the cashier at the restaurant when ordering that they want to redeem one of more of their coupons. The card holder then hands the cashier the coupon card. The cashier peels off the requisite coupon for that particular establishment. The cashier has a second component, the tracking sheet 100, located in her cashier drawer. The tracking sheet is about the size of a dollar bill. This allows the tracking sheet 100 to fit in one of the compartments in the cashier's tray normally used for holding paper currency. After the cashier has peeled off the mini coupon from the discount card, she affixes it to the tracking sheet kept in the cash register tray. The peeled off coupon 20 has sufficient adhesive backing remaining on it so that it will permanently affix itself to the tracking sheet 10. This sequence of transferring the coupon from the card to the sheet is illustrated in FIGS. 12 and 13. The tracking sheet has room at the top of it for printing with adjacent blank lines to enter information such as date, register number, location, shift number and the like. The tracking sheet also has a grid layout defining a plurality of squares, which are slightly larger than the mini coupons. The squares are sufficiently large to accommodate the coupons to be affixed to the tracking sheet without having to be placed too closely to one another. After the cashier has affixed the coupon to the tracking sheet, the cents off coupon or the free item coupon as the case may be, is deducted from the customer's itemized bill in the usual manner. The cashier then returns the redemption card to the customer. At the end of the shift or at any reasonable interval, the manager can remove the cash drawer tray along with the cash received, and the tracking sheet with the affixed coupons. The tracking sheet with the affixed coupons function as a convenient reference list to assist in counting the cash and coupons in the cash drawer tray in order to tally and balance out the total transactions for the shift with the amount of money and coupons taken in.

The redemption card 10 is fabricated from four flat sheets of superposed layered material. The card 10 has a front face 25 and a back face 15. The front face 25 is used for printing identification, graphics, or advertising on it, which is readily visible on the card. The back face shows the peel off mini coupons 20. The front face 25 of the coupon card comprises the front side of a sheet 30 of paper and is described as a tag 12 point release liner. The sheet 30 is described as the base layer. The back side 35 of the sheet 30 has a layer of adhesive 40 applied to it. The adhesive 40 is sold by FASSON label, which it calls SP11G special liner. The adhesive has a rubber-like base material. It is very tacky to allow the coupon to adhere to many types of material. The adhesive will not "bleed" or melt when it becomes warm. This is necessary, because the coupon card will be carried in a man's wallet. The man can sit on his wallet containing the coupon card, and yet the adhesive will remain stable. The next sheet is used for the coupons. This sheet 50 is described as the coupon layer. This sheet is sold by FASSON label manufacturing company. It is described as number #60 blue/white high gloss white cream coat. FASSON sells its sheets under the federally registered trademark CRACK'N PEEL Plus. This material is sold as 11.5"×15" sheets or approximately 1,000 foot long rolls. The top face of the liner which contains the advertising usually has a plastic film to cover the advertising to provide a more durable and shiny surface to the card. This top film 60 is known as face stock and it is made out of 0069-2 Mil UCL Polyolam NPL Film. The card normally requires five different operations just to make the card material. There are two material companies and a laminating company to create the material in sheet or roll form. The printer then prints the advertising on the face of the sheet in sections so that the cards can be cut separately and then on the bottom face of the material the appropriate coupons are printed on the card in the appropriate spaces. After the printing has taken place, then the top face of the tag liner is covered with the durable plastic liner or sealed with a liquid protective sealant. The coupons are also die-cut during the printing process. Therefore, the printing process comprises printing the top and the bottom of the card, putting a plastic laminate on one side of the card and die-cutting the other side of the card. The die-cutting process is sufficiently deep so that the coupons can be peeled off.

Figure 11:
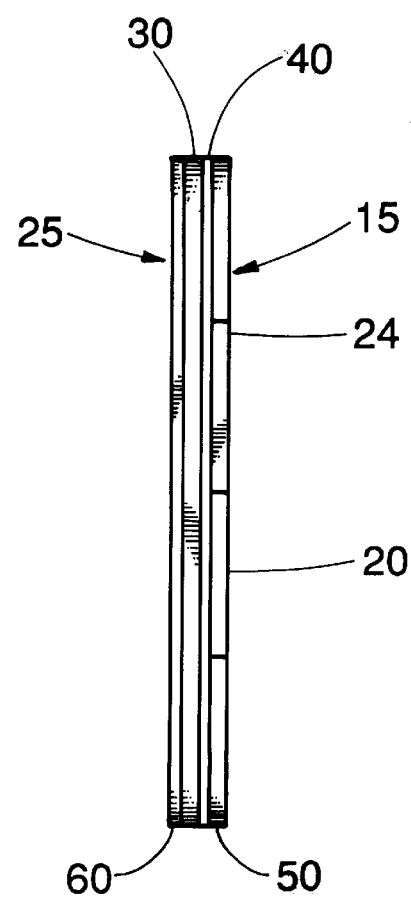
FIG. 11 is an enlarged view of FIG. 6 clearly showing the layers of the materials forming the coupon redemption card.
Figures 12, 13:
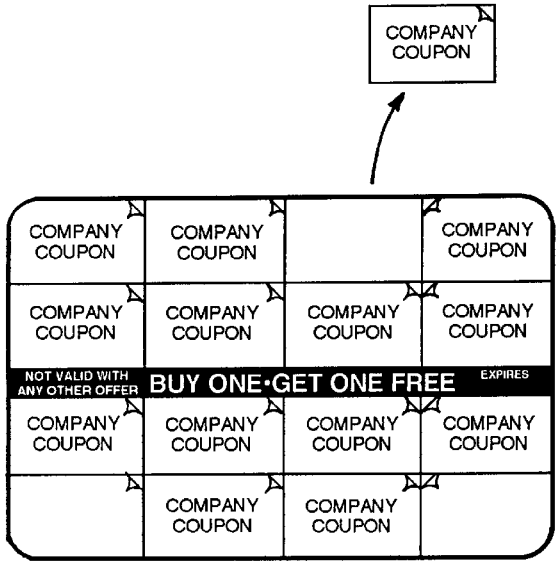
FIG. 12 illustrates the back face of a single redemption card having sixteen mini coupons with various fast food restaurants printed thereon.
FIG. 13 illustrates a typical tracking sheet used by a redemption center such as a fast food restaurant.

FIG. 11 illustrates the side view of the coupon card. FIG. 12 illustrates the side view of a double coupon card. The thicknesses of the layers are exaggerated to clearly illustrate the layering of the card.

Figure 8:
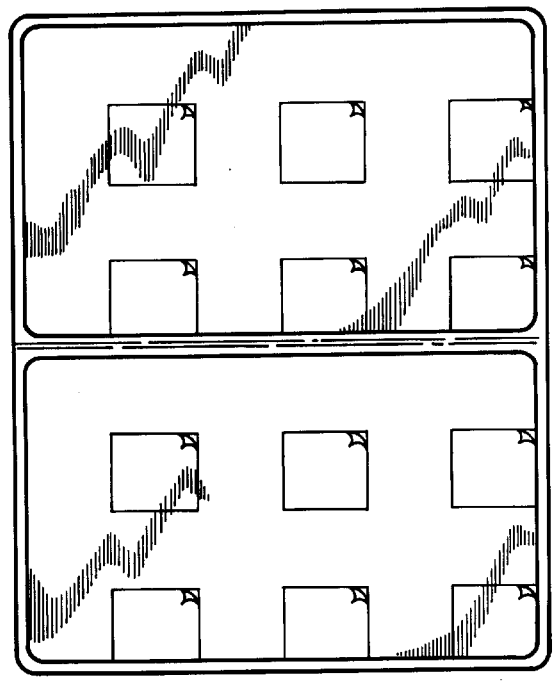
FIG. 8 is a top plan view of an alternate embodiment of the coupon card shown in FIG. 1.

FIG. 8 illustrates a double card where the coupons are spaced apart. FIG. 9 illustrates one type of tracking sheet.

It is to be understood that the specific materials used to form the card can be substituted for those herein described. The coupon card material is similar to a peel off label sold at office supply stores. The coupon card is an enlarged label and improved to form the coupon card. The coupon sheet and the base sheet could be fabricated from any number of materials. The adhesive film could be any number of films already on the market. The plastic film could also be any number of films already available on the market.

Figure 15:
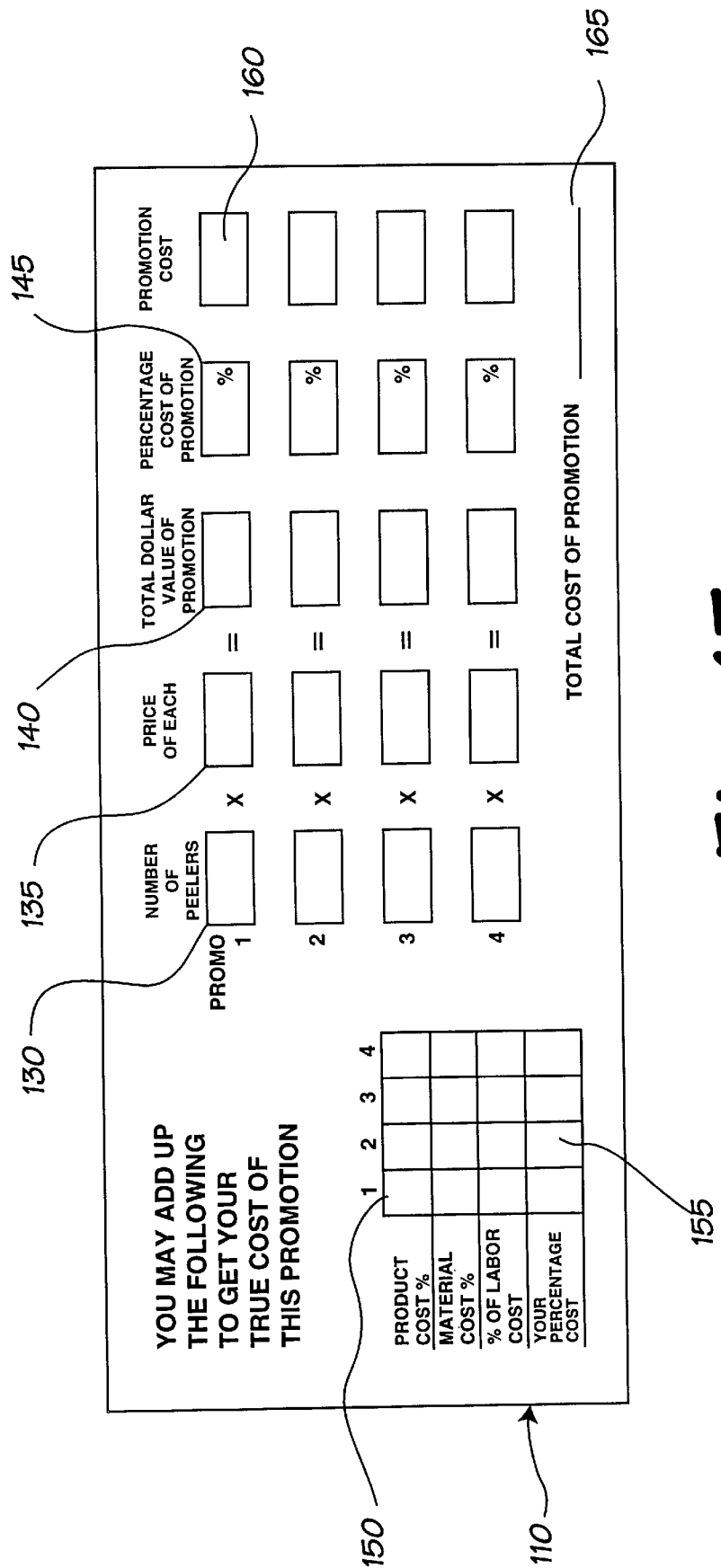
FIG. 15 is a bottom plan view of the second alternate tracking sheet shown in FIG. 14 where the value of each redeemed peel-off coupon from the card can be tracked.
Figure 17:
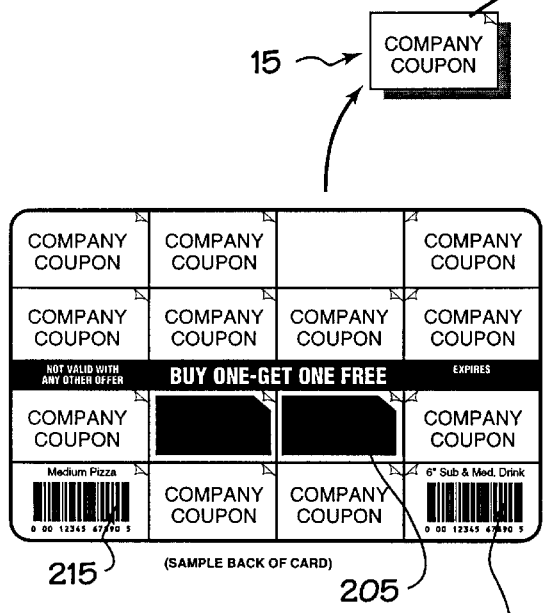
FIG. 17 is top plan view of FIG. 16 showing a variant of the basic peel-off coupon tracking system having a concealed scratch-off coupon and a bar code on another peel off coupon.
Figure 18:
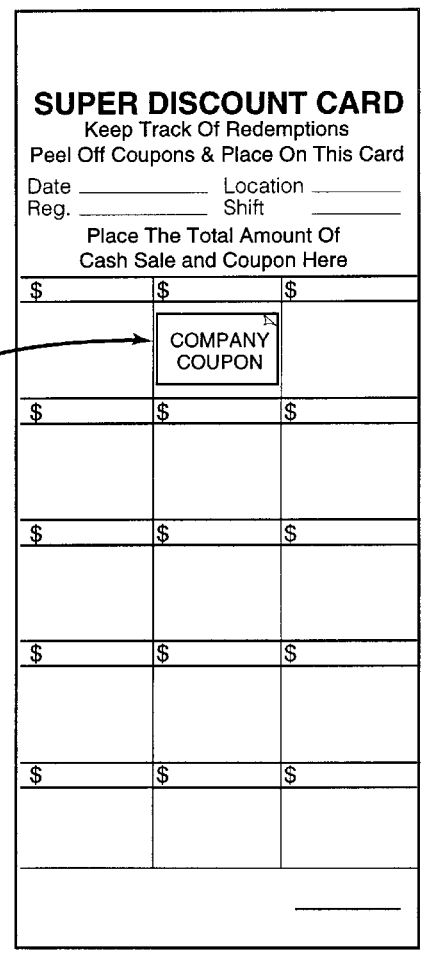
FIG. 18 is the face of a tracking sheet very similar to FIG. 16 where each redeemed peel-off mini coupon from the card can be affixed thereto, and which is shown in FIG. 17.

FIG. 14 illustrates a top plan view of a second alternate tracking sheet where each redeemed peel-off coupon from the card can be affixed thereto. FIG. 15 illustrates the bottom plan view of the second alternate tracking sheet shown in FIG. 14 where the value of each redeemed peel-off coupon from the card can be tracked;

After the counter clerk removes a peel-off coupon 15 from the coupon card, he or she affixes the coupon onto one of the squares 115 on the tracking card 110 shown in FIGS. 14 and 18. FIG. 17 and FIG. 18 show the step of transferring the peel-off coupon 15 to the tracking sheet. The total amount of the sale is then written in the top of the square 120 adjacent to the $ symbol and immediately above the coupon. At the end of the shift or sooner if the tracking sheet is filled up with redeemed coupons, the clerk then adds up the total dollar value on the front of the sheet for the total sales. FIG. 14 shows a line 125 towards the bottom to insert total sales. The back side of the tracking sheet in FIG. 15 illustrates four rows of boxes. In the first box 130 in row one, the clerk enters the total number of peel-off coupons received for the promotion. For example, buy one regular hamburger and get one free. The clerk then enters the price of the peel-off items in the second box 135 in row one. The amount in box one is multiplied by the amount in box two and the product of the multiplication is entered in box three 140 on the first row. The clerk must then calculate the percentage of the cost of promotion to be entered in box 145. In the left column 150 the percentage of the product cost is entered, then the cost of material is entered and then the total labor to make the item is entered. Theses figures are supplied by management. The total is added and entered in box 155. The same number is entered in box 145 in the first row. The number in box 145 is subtracted from the number in box 140 to arrive at the cost of the promotion, which is entered in box 160 in row one. The next three rows of boxes are used if the promotion covers other items such as a free coke or order of fries. The right boxes 160 and below are totaled to arrive at the total cost of the promotion which is entered on line 165. The tracking sheet means can be any type of surface where the redeemed coupons could be affixed to. For example, it could be a blank piece of cardboard, a blank sheet of paper, or any flat unmarked surface capable of holding the redeemed coupons.

Figure 16:
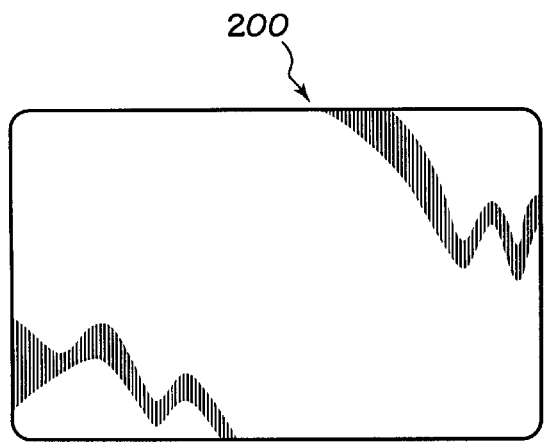
FIG. 16 is a bottom plan view of a variant of the basic peel-off coupon system.

FIG. 16 illustrates a bottom plan view of a variant of the basic peel-off coupon card 200. FIG. 17 is a top plan view of FIG. 16 showing a variant of the basic peel-off coupon tracking system having a concealed scratch-off coupon 200 and a bar code 210 on another peel off coupon. The scratch-off cover 205 is a hot foil treatment that is applied to one of more coupons after the coupons are printed. It is intended that the underlying coupon offers a special prize for the cardholder. For example, the hidden coupon could offer a free hamburger, coke, or fries to the cardholder. Also illustrated in FIG. 17 is a bar code 215 indicating a medium pizza. The bar code is machine readable by a wand bar code reader or a stationary bar code scanner. The addition of bar codes on the peel-off coupons allows for greater tracking capability on the part of the redemption card center, which is usually a fast food restaurant. After a tracking sheet such as those illustrated in FIGS. 14 and 18 are filled with redeemed coupons, the filled tracking sheets could be scanned or read by a bar code reader that would send the data to a computer which would tabulate the redeemed coupons to accelerate the tracking process, and would reduce or eliminate human error. It would also reduce the number of man hours needed to manually tabulate the filled tracking sheets. FIG. 18 is the face of a tracking sheet very similar to FIG. 16 where each redeemed peel-off mini coupon 15 from the card 200 can be affixed thereto, and which is shown in FIG. 17.

Figure 19:
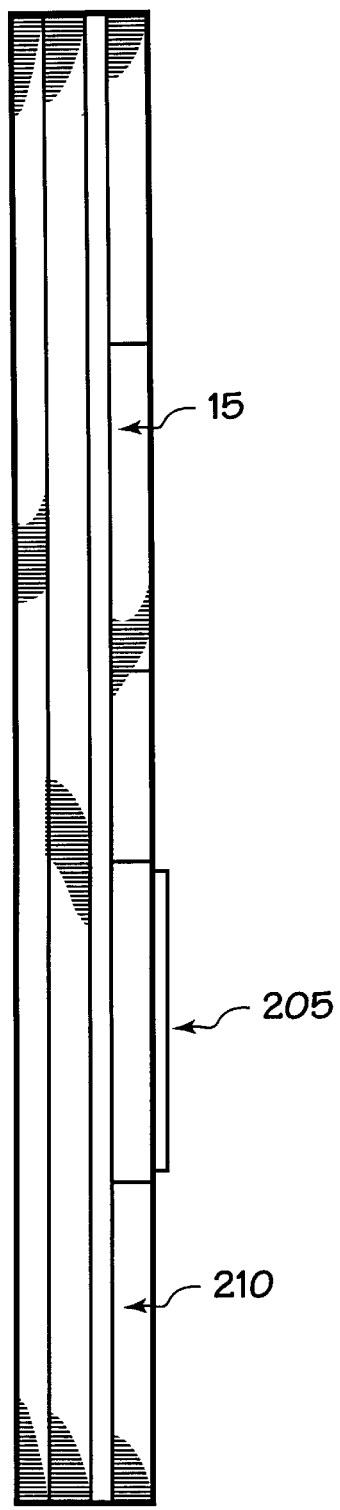
FIG. 19 is an enlarged left side elevational view of FIG. 17, the right side being identical and showing the scratch-off layer.

FIG. 19 is an enlarged left side elevational view of FIG. 17 showing the scratch-off layer. The scratch-off layer 205 is clearly visible. The thicknesses of the laminated layers forming the card and the foil scratch-off layer are greatly exaggerated to clearly illustrate the various laminated layers.

Figure 20:
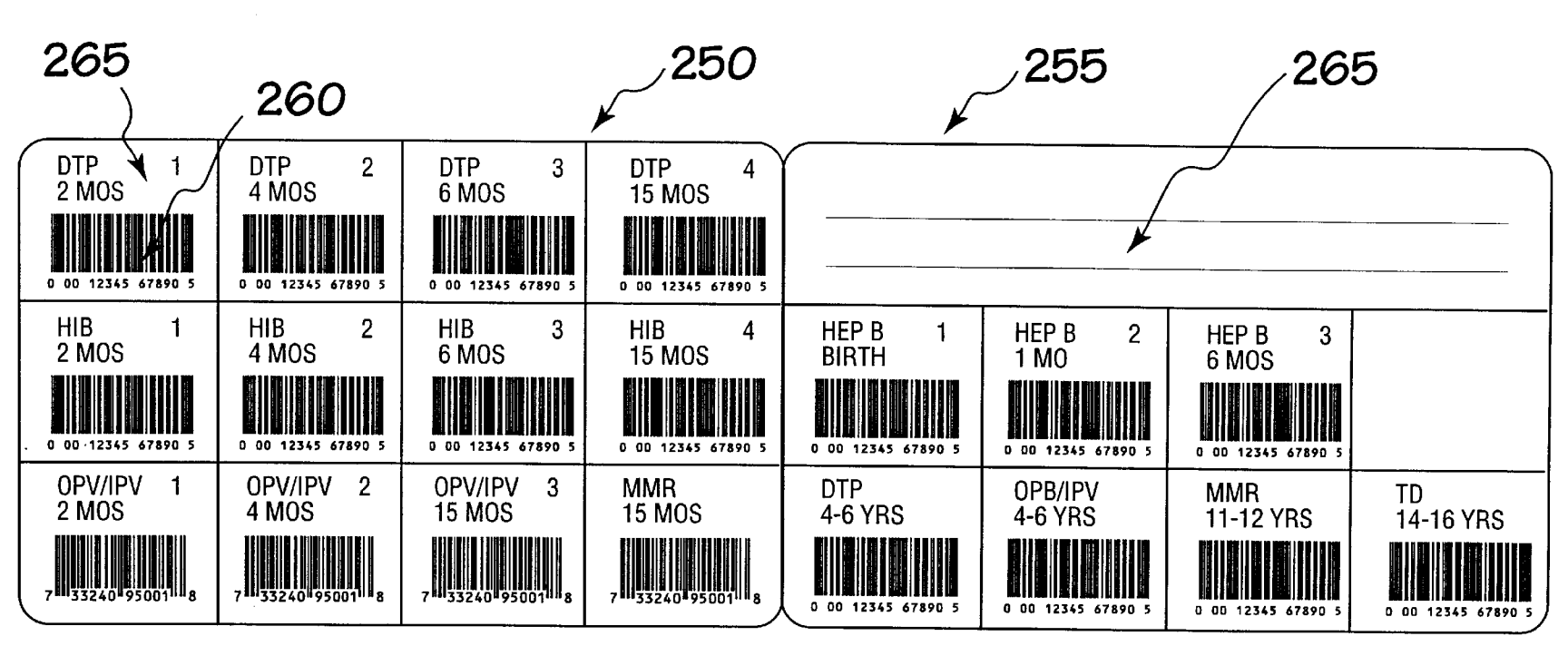
Figure 21:
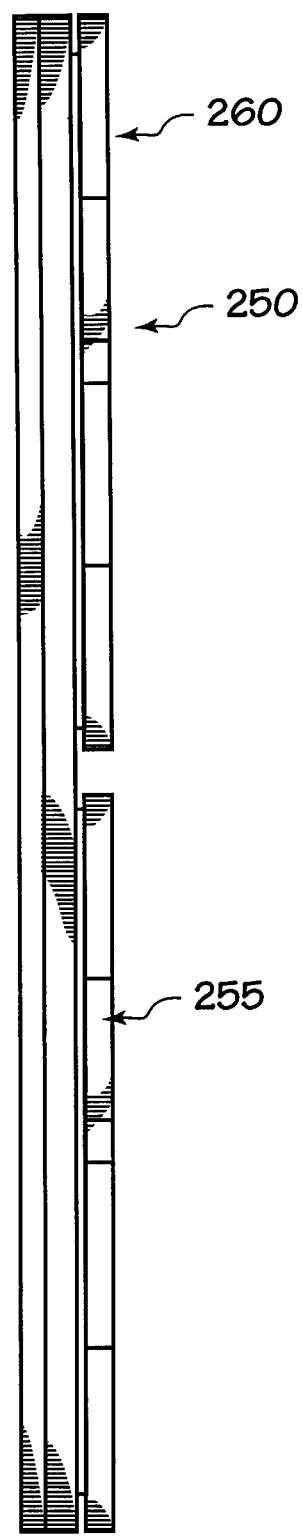
FIG. 21 is an enlarged front elevational view of the pair of immunization cards shown in FIG. 20.

FIG. 20 illustrates a top plan view of a complementary pair of foldable immunization tracking coupon cards 250 and 255 with bar codes 260 imprinted on each mini coupon. FIG. 20 illustrates the pair in the unfolded position. FIG. 21 is an enlarged front elevational view of the pair of immunization cards shown in FIG. 20. The present invention can be adapted to be used as an immunization card used in tracking the immunization record for a child. The method of using the present invention in this way can be practiced by issuing an immunization card that has a series coupons 265 having bar codes 260 thereon and which represents the required vaccination shots needed by a child from two months of age up to sixteen years of age. Many local schools will not enroll a child unless the parent can produce evidence that the child has already had certain vaccinations. The present invention can be used to verify this information. Additionally local, state, and federal health officials feel that the immigration of young children and child bearing adults has created a unique problem in trying to keep track of these children to ensure that they are receiving their necessary vaccinations such as their DTP vaccinations. Failure to properly vaccinate these young immigrant children could lead to epidemics of diseases that are easily protectable against by proper vaccinations. The card shown in FIGS. 19 and 20 would be completed for each child. The lines 265 could be used to enter information about the child. The child's name and social security number would be entered into some type of data base operated by the government. The child's parents would keep the immunization card, and would present it to the doctor each time the child had its appropriate vaccinations. The doctor would then remove the peel-off coupon 265 for the particular vaccination administered, and then would place it on a tracking sheet. The doctor would then mail the completed tracking cards to the appropriate department in charge of tracking vaccinations for young children. The department could read the bar codes 260 with a bar code reader and then have the information entered into a computer. The computer could keep track of the children who are not receiving their vaccinations, and could send out reminder notices to the parent or the physician that the child needs specific vaccinations.

The microprocessor chip or memory chip can also be adhered to the immunization card illustrated in FIG. 20. The micro chip could contain immunization data on the child so that the information could be stored electronically in a health organizations computers to keep accurate records.

Figure 22:
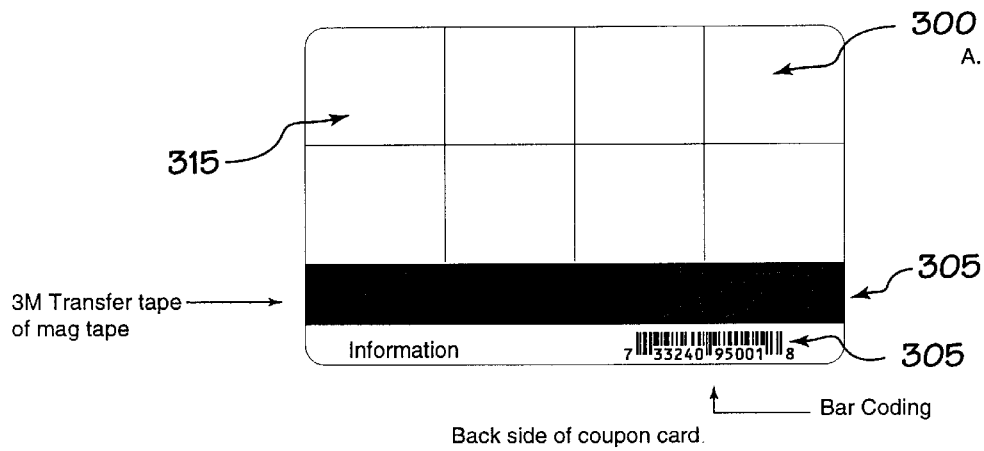
FIG. 22 is top plan view similar to FIGS. 4, 12, 17 showing the coupon side of a variant of the basic peel-off coupon card fabricated from vinyl or PVC and having a magnetic strip and a bar code to identify the entire card rather than just the mini coupon.

In the drawings, FIG. 22 illustrates the back side of a redemption card 300 and is similar to the views shown in FIGS. 4, 12, 17. FIG. 22 illustrates the coupon side of a variant of the basic peel-off coupon card. The card can be fabricated from vinyl of PVC. A magnetic strip 305 and a bar code 310 are positioned on the card 300 to identify the entire card rather than just the peel-off mini coupon 315.

Figure 23:
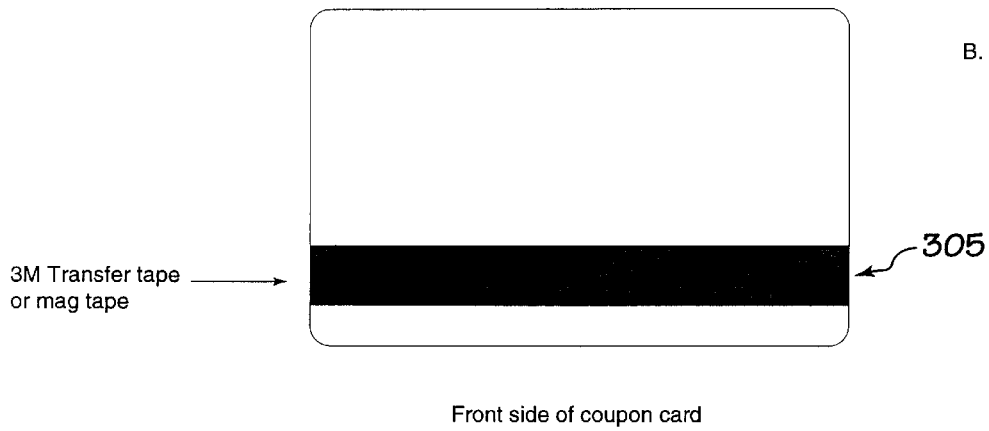
FIG. 23 is the reverse side of the card shown in FIG. 22.
Figure 24:
FIG. 24 is top plan view similar to FIGS. 4, 12, 17 and 22 showing the coupon side of a variant of the basic peel-off mini coupon card having free coupons for use in a gambling casino.
Figure 25:
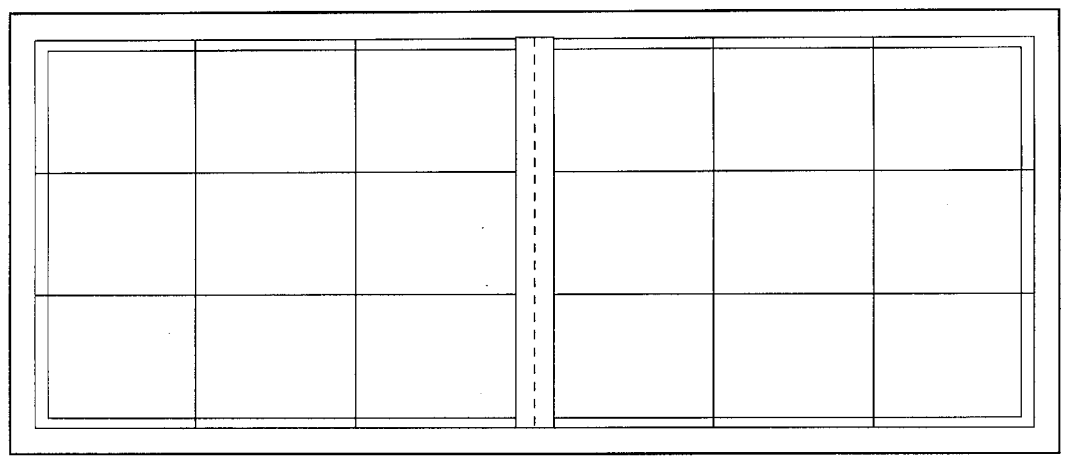
FIG. 25 is a top plan view similar to FIGS. 1, 8, and 20 view of a complementary pair of double flap foldable stamp or mini coupon cards, and is illustrated in the unfolded position.

FIG. 23 is the front, or reverse side of the card 300 shown in FIG. 22. FIGS. 22 and 23 are life size depictions of the card as illustrated on 8½" by 14" paper. Printed matter such as advertising or a description of the card would normally be printed on the front side shown in FIG. 23. The magnetic strip 305 illustrated in FIGS. 22 and 23 can be a special strip made by Minnesota Mining and Manufacturing company, commonly known as 3M. 3M refers to it as magnetic strip stock number 315 84 98011 4811. It can be directly applied to paper and can function as a magnetic strip. Everyone is familiar with a bank or gasoline type of credit charge card. The typical bank or gas credit charge card generally has the appearance as that illustrated in FIG. 22. The magnetic strip 310 is positioned along one or both sides of the card 300. The magnetic strip 310 is blank when the card is fabricated.

An encoding machine is available which can electronically encode any message on the magnetic strip.

As regards the present invention, an encoding device could be used to activate the card 300 shown in FIGS. 22 and 23 so that the card could be used in any number of applications. A quantity of cards could be fabricated and sold to the ultimate redeemer of the cards who wishes to function as a redemption center. The encoding machine could be made available to this entity so that the blank magnetic strips 305 on the cards could be encoded according to the wishes of the purchaser of the cards. The front side of the card illustrated in FIG. 23 could be made from vinyl or PVC. The approximate thickness of the card could be 0.007 to 0.020 inches. The transfer tape 305 has high coercivity. The bar code 310 may be placed on the front or the back of the card 300. The card illustrated in FIGS. 22 and 23 is the preferred configuration. It is to be understood, however, that the card may be any size or shape.

Figure 26:
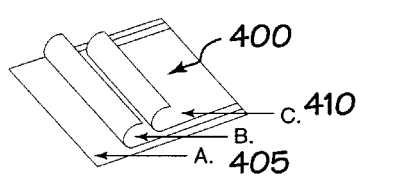
FIG. 26 is a perspective view of the edge of the card illustrated in FIG. 25
Figure 27:
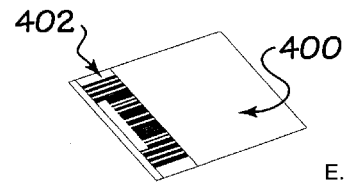
FIG. 27 is a perspective view of an example of a mini coupon or stamp with a bar code placed thereon. The mini coupon can be used as illustrated in FIGS. 1, 4, 8, 12, 17, 20, or 25.
Figure 28:
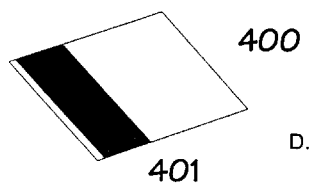
FIG. 28 is a perspective view of an example of a mini coupon or stamp with a magnetic strip placed thereon. The coupon can be used as illustrated in FIGS. 1, 4, 8, 12, 17, 20, or 25.
Figure 29:
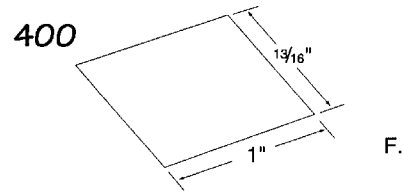
FIG. 29 is a perspective view of an example of a regular mini coupon or stamp. The coupon can be used as illustrated in FIGS. 1, 4, 8, 12, 17, 20, or 25.

Additional variations of the special coupons and coupon cards are illustrated in FIGS. 25 through 29. The individual peel-off coupon card 400 can have dimensions of 1" by $^{13}/_{16}$". The overall length of the double flap stamp card or coupon card 420 can be 6⅝" by 2⅜". The release liner 405, labelled "A" in FIG. 26, is referred to as a release liner. It can have thicknesses of 6,8,10, or 12 tag. Tag is a term in the label making industry indicating thickness. The front side of A is for printing and coating. The back side of A is a release for liner for face stock. The top layer "C" 410 is a facestock with an adhesive on one side. The coupon 400 illustrated in FIG. 28 has a 3M special paper magnetic strip 315 84 98011 4811 401 and can be applied to paper. The magnetic strip 401 illustrated in FIG. 28 can be ¼" width and placed along the bottom edge of the peel-off coupon 400. This still leaves sufficient room for placing printed matter above the magnetic strip. The strip of bar code 402 in FIG. 28 is ¼" wide. A regular peel-off coupon 400 is illustrated in FIG. 29. It is $^{13}/_{16}$" wide and 1" long. A regular coupon and the coupons illustrated in FIGS. 25,26,27, and 28 can also have these same dimensions.

Figure 40:
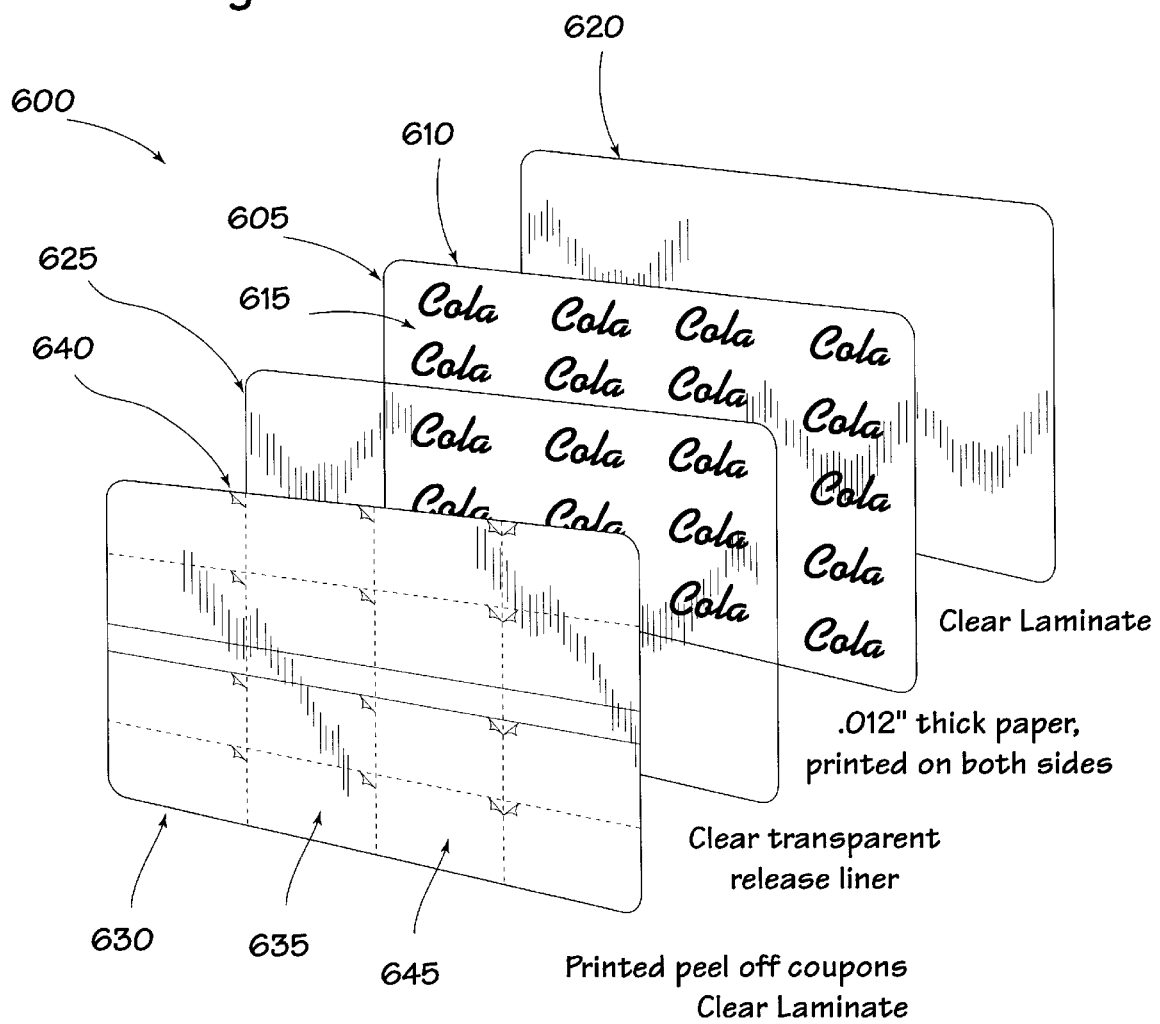
FIG. 40 is an exploded perspective view of a four-layer coupon redemption card with a clear transparent release liner.

Another variant of the four-layer coupon redemption card illustrated in a exploded perspective view in FIG. 40 will now be discussed. The four layers are the top protective clear layer, the base layer, the clear liner layer, and the coupon layer. The four-layer laminated coupon redemption card 600 has a base layer 605 which has a front face 610 and a back face 615. The base layer is 0.012" in thickness. The front face and the back face have printed matter on them. The front face is also called the billboard. The billboard contains the name of the card and information about the card. The billboard is used for printing identification, graphics, or advertising on it, and which is readily visible on the finished card. The back face of the base layer has a series of trademarks printed in the same spaces where the coupons overlay the base. As each coupon is removed from the card the trademarks become exposed. It is a form of advertising for a trademark. In FIG. 40 the generic term cola is printed on the back face. A protective clear layer 620 covers the front face of the base layer 605. The protective layer is labelled as a clear laminant in FIG. 40. A clear liner layer 625 is applied to the back face of the base layer. The clear liner layer is labelled a clear transparent release liner in FIG. 40. In the coupon redemption cards previously discussed, the release liner is usually opaque. In the present card 600 the liner is clear so the trademarks printed on the back of the base layer can be seen after the coupons are removed. The fourth layer is a coupon layer 630 which has a coupon face 635 and an adhesive back 640 for adhering to the clear liner layer 625. The coupon face 635 of the coupon layer has coupons printed on it which are kiss cut at regular intervals to form a matrix of small adhesive backed removable coupons 645. The broken lines on the coupon layer as illustrated in FIG. 40 indicate the kiss cut locations for forming the coupons 645. The term kiss cut is a printer's term and is similar to a die cut. Kiss cut means the cut is made sufficiently deep to form the removable coupons, without cutting into the release liner. The clear layer 625 can be formed from the adhesive applied to the back of the base layer. The adhesive can set to form a clear layer. Or the clear layer can be a sheet of plastic and the adhesive is applied between the plastic sheet and the back of the coupons. It should be understood that during the laminating processes to form the complete coupon, the laminants can be made to adhere to the other layers without the application of adhesive to separate layers to hold the layers together.

The four-layer laminated coupon card 600 as illustrated in FIG. 40 can have a memory chip or a microprocessor chip adhered to the card. The coupon card 600 can have a bar code printed on the card. The coupon card can have a bar code on each of the peel-off coupons 645. The coupon card can have a magnetic strip affixed to the card. The coupon card can have magnetic strips affixed to each of the peel-off coupons. The coupon card can have both a bar code and a magnetic strip on the card or on the coupons or any combination of the two. Further, one or more of the peel-off coupons can be covered with a removable foil layer, which has already been referred to as a scratch-off layer.

The single redemption card with an IC, memory, or microprocessor chip as illustrated in FIGS. 30–39 will now be discussed. The single card 450 is similar or identical to the coupon cards previously described and the previous descriptions apply to the cards in FIGS. 30–39. A company called SOLAIC with headquarters in Paris, France provides memory chips or microprocessor chips which can be adhered to one side of the card as illustrated in FIG. 30. The chip is labelled 455 in the drawings. A microprocessor chip is also known as an integrated circuit chip, which is called an IC chip for short. IC chips find wide application in the computer industry. SOLAIC sells a type of microprocessor chip called the Eurochip. It has 221 bits of EEPROM with secured counting logic. SOLAIC also sells other types of microprocessor chips. A microprocessor chip functions like a ram chip. It can be reprogrammed. A memory chip is available from SOLAIC, which it calls the 256 memory chip. The 256 chip has 256 bits non erasable in PROM. These chips are used to make smart cards. Smart cards and their applications are discussed in the Background of the Invention, supra.

After the card 450 has been fabricated, a memory chip or a microprocessor chip such as a SOLAIC chip labelled 455 can be adhered to either side of the face of the card. The face of the chip must be exposed so that an electronic reader can read the chip. Since the coupons are placed on the back of the card, the exposed chip should be adhered to the front of the card. Machines are available which will automatically adhere the chips to the front of the cards at high speed. The adhered chip can be a memory chip or a microprocessor chips. The cards illustrated in FIGS. 30–33 and 38–39 can be used as smart cards. The cards also are used as coupon redemption cards as previously discussed. The cards have dual applications. The card 450 is an integral smart card/coupon redemption card.

The double flap card 500 illustrated in FIGS. 32–33 is in effect the coupon redemption card 450 joined at one end to one end of a smart card 502. The user has a double card, which can be folded back upon itself so that it can be conveniently placed on one's wallet or purse. The card can be used to redeem the promotional coupons and also as a smart card to pay for phone calls, bus fare and to make inexpensive purchases. This combination is very convenient to the card holder.

The memory chip or microprocessor chip could be programmed for a variety of applications. For example, the chip could contain information about the coupon card itself and the peel-off coupons, just as the bar codes and the magnetic strips attached to the cards reveal information electronically when read by a bar code scanner or a magnetic strip reader or both. An electronic microelectronic chip reader similar to a magnetic strip reader can be positioned adjacent a cash register at a fast food restaurant. The cashier can take the coupon card and insert it into the micro chip reader. The reader would then relay information to the cash register or to a computer terminal. Since micro chips can contain unlimited information in electronic form, the micro chips could be programmed to convey very detailed information to a computer. Electronic accounting could be taking place to track the redeemed coupons at the fast food restaurants.

Figure 34:
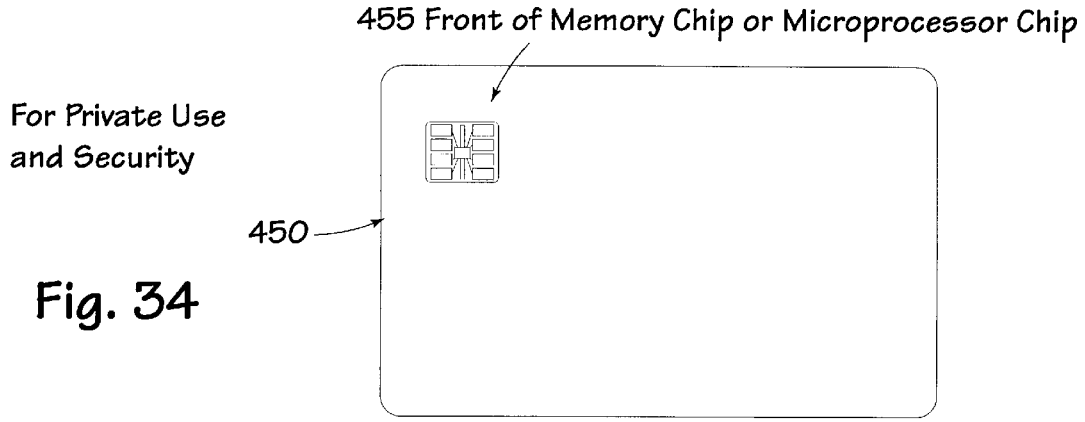
FIG. 34 illustrates the front of a coupon card similar to the card shown in FIG. 30 with the micro chip in the upper left-hand corner.
Figure 35:
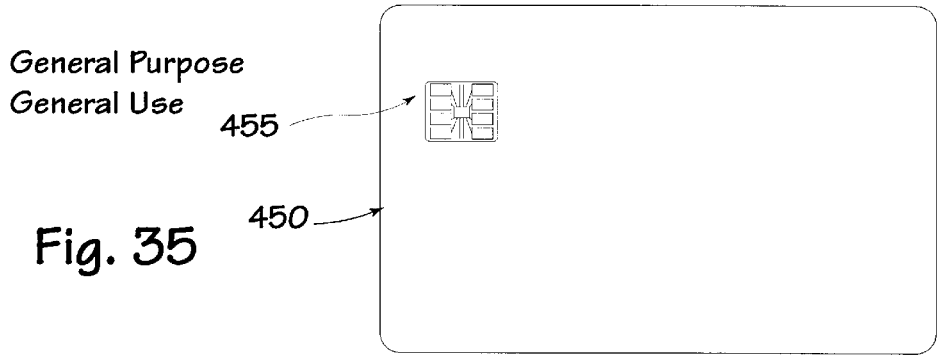
FIG. 35 illustrates the front of a coupon card similar to the card shown in FIG. 30 and 34 with the micro chip in the middle of the left edge of the card.
Figure 36:
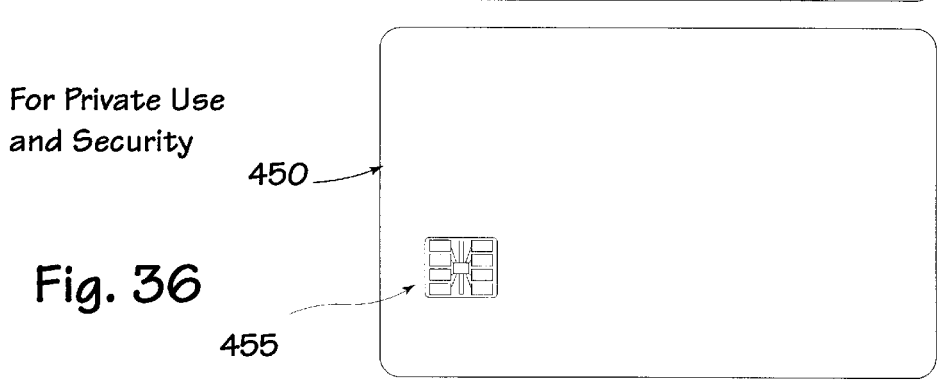
FIG. 36 illustrates the front of a coupon card similar to the card shown in FIGS. 30, 34–35 with the micro chip adhered to the card in the mid-lower left-hand corner.
Figure 37:
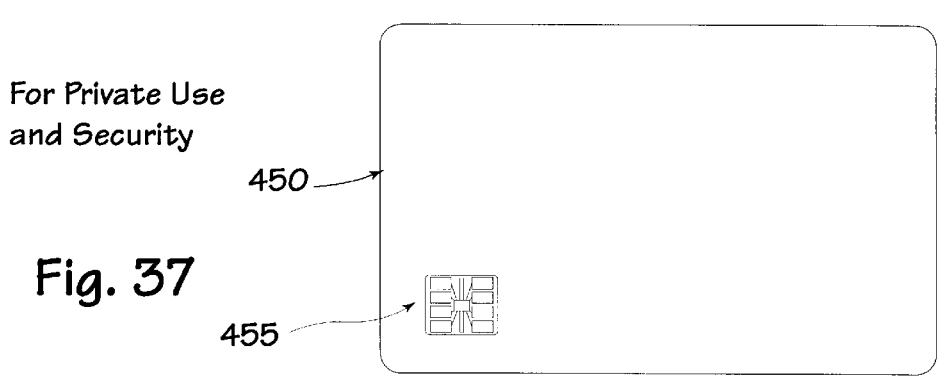
FIG. 37 illustrates the front of a coupon card similar to the card shown in FIGS. 30–34–36 with the micro chip adhered to the card in the lower left-hand corner.
Figure 38:
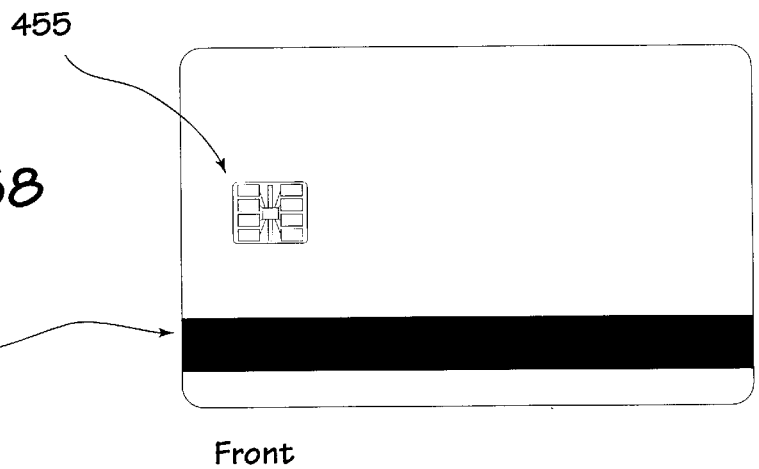
FIG. 38 illustrates the front of a coupon redemption with a memory chip or a microprocessor chip and a magnetic strip adhered to the card.
Figure 39:
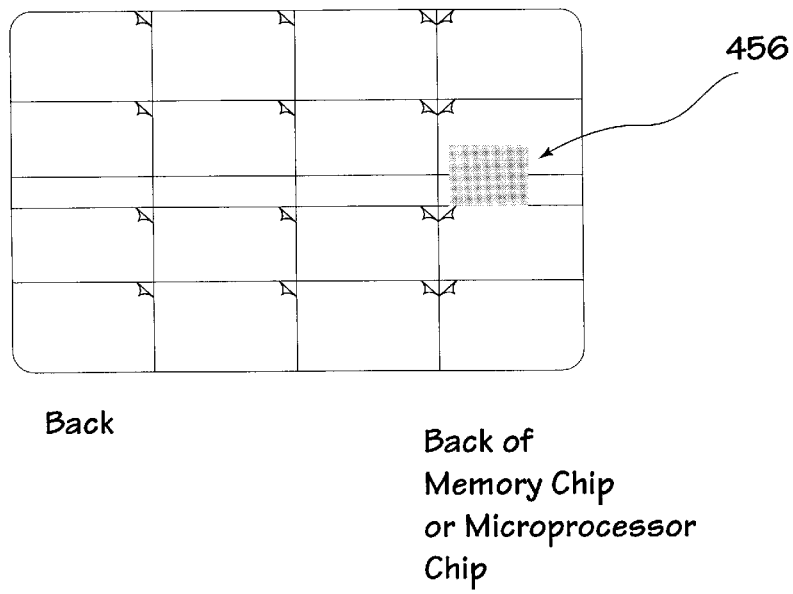
FIG. 39 is the back or coupon side of the card shown in FIG. 40 and back of the electronic chip.

The front cards illustrated in FIGS. 34–36 are similar to the card illustrated in FIGS. 30 and 31. The microprocessor chips are adhered to the card at non-conventional locations. The card can be used as a security entry card. The micro chip could be programmed with secret codes and other data about a particular individual such as the individual's face, hand prints, or voice prints. The electronic reader would be programmed to open a door when the card is inserted into the reader and the reader acknowledges that the card is an authorized card and the card matches the individual. The reader could be designed to only read the card with the micro chip adhered at a non-conventional spot on the card such as illustrated in FIGS. 34–36. By placing the chips at non-conventional locations on the card, the card becomes much harder to counterfeit. It makes it more difficult for a counterfeiter to take a smart card and reprogram the chip to make it compatible with a security clearance smart card. Additionally the cards can have the peel-off coupons on the back which could be used for a variety of security functions.

The micro chip can be adhered to the casino card illustrated in 24. Casinos now have slot machines with magnetic card readers. Specials cards with secret codes on the magnetic strip are handed out to casino customers as a promotion. The card allows the casino patron $25 to $50 to pay the slots. The card holder inserts the card with the magnetic strip into the reader and he is electronically credited with $50 to play the slots. He plays the slots until he gambles away the $50, or if he wins, the slot machine dispenses coins. The casino card with the micro chip is more sophisticated. The slot machine microprocessor chip readers could be reprogrammed on a daily basis to change the secret codes that are recognized by the reader. The microprocessor chip to be adhered to the casino cards could be electronically programmed with the new code so that the reader would accept the card. A microprocessor chip can easily be reprogrammed even after it has bee adhered to the casino card. It would be impossible for an individual to program a microprocessor chip to make it compatible with the chip reader on the slot machine. This is a security function of the casino card.

The casino card has a scratch-off layer for a possible jackpot, the micro chip gives the customer a $50 credit to play the slots, and the peel-off coupons give the customer free or reduced meals and other gratuities as printed on the peel-off coupons on the casino card.

It is to be understood that the present invention includes the affixation or adherence of a memory chip or a microprocessor chip to the coupon card.

A coupon redemption card and tracking system includes a credit card size redemption coupon card used by the customer, and a tracking sheet used by the redemption center such as a restaurant. The redemption card has a plurality of mini coupons, which can be peeled off individually. Each redeemed coupon is affixed to a tracking sheet. The tracking system facilitates the accounting and inventory of redeemed coupons. The coupon card is formed as two laminated layers of special paper joined together by a layer of adhesive material, and a layer of clear plastic film on the top face of the card. The base layer is fabricated from a special paper. An adhesive coating is applied to one side of the base layer. The peel off coupon layer is affixed to the adhesive coating. The finished layered sheet is printed on both sides, die-cut on the coupon side, and then laminated with the film on the other side. Each coupon that is removed from the card has adhesive to adhere the coupon to the tracking sheet. The small size of the mini coupons is convenient for the card holder and the redemption center. The system can be used wherever one has to keep track of various redeemable coupons. A memory chip or a microprocessor chip is adhered to the card to form a memory smart card. The microprocessor chip is programmed to contain information about the card so that a chip reader can read the information about the card.

While the present invention has been shown and described herein in what is conceived to be the best mode contemplated, it is recognized that departures may be made therefrom within the scope of the invention which is therefore not to be limited to the details disclosed herein, but is to be afforded the full scope of the invention.

What is claimed is:

1. A method of redeeming a coupon secured to a redemption card which comprises:

presenting to a redemption center a redemption card having a memory chip or microprocessor chip and a bar code thereon and containing at least one peel-off coupon;

peeling off at least one said peel-off coupon from said redemption card;

transferring said peel-off coupon to a tracking means;

crediting the value of said peel-off coupon to the redeemer by reading said bar code on said redemption card with a bar code reader or by reading said memory chip or said microprocessor chip with an electronic reader; and returning said redemption card to the redeemer.

2. A method of redeeming a coupon secured to a redemption card and tracking the redeemed coupon, which comprises:

presenting to a redemption center a redemption card having a memory chip or microprocessor thereon, and containing at least one peel-off coupon having a bar code thereon;

placing a tracking means at said redemption center;

peeling off at least one said peel-off coupon from said redemption card;

transferring said peel-off coupon to said tracking means;

crediting the value of said peel-off coupon to the redeemer by reading said bar code on said peel-off coupon with a bar code reader or by reading said memory chip or said microprocessor chip with an electronic reader; and returning said redemption card to the redeemer.

3. A method of redeeming a coupon secured to a redemption card which comprises:

presenting to a redemption center a redemption card having a memory chip or microprocessor chip, and a magnetic strip thereon, and having at least one peel-off coupon thereon;

peeling off at least one said peel-off coupon from said redemption card;

transferring said peeled-off coupon to a tracking means;

crediting the value of said coupon to the redeemer by reading said magnetic strip on said card with a magnetic strip reader or by reading said memory chip or said micro processor chip with an electronic reader; and returning said redemption card to the redeemer.

4. A method of redeeming a coupon secured to a redemption card and tracking the redeemed coupon, which comprises:

presenting to a redemption center a redemption card having a memory chip or a microprocessor chip thereon and containing at least one peel-off coupon having a magnetic strip thereon;

peeling off at least one said peel-off coupon from said redemption card;

transferring said peeled-off coupon to a tracking means;

crediting the value of said coupon to the redeemer by reading said magnetic strip on said peel-off coupon with a magnetic strip reader or by reading said memory chip or said microprocessor chip with an electronic reader; and returning said redemption card to the redeemer.

5. A method of redeeming a coupon secured to a redemption card which comprises:

presenting to a redemption center a redemption card having a memory chip or a microprocessor chip, a bar code, a magnetic strip, and at least one peel-off coupon;

peeling off at least one said peel-off coupon from said redemption card;

transferring said peeled-off coupon to a tracking means;

crediting the value of said coupon to the redeemer by reading said bar code on said redemption card with a bar code reader or by reading said magnetic strip on said redemption card with a magnetic strip reader or by reading said memory chip or said microprocessor chip with an electronic reader; and returning said redemption card to the redeemer.

6. A method of redeeming a coupon secured to a redemption card and tracking the redeemed coupon, which comprises:

presenting to a redemption center a redemption card having a memory chip or a microprocessor chip thereon and at least one peel-off coupon covered with a removable scratch-off layer;

removing said removable scratch-off layer from said peel-off coupon;

reading the message on said visible coupon;

peeling off said visible peel-off coupon from said redemption card;

transferring said peel-off coupon to a tracking means;

crediting the value of said coupon to the redeemer; and returning said redemption card to the redeemer.

7. A laminated coupon redemption card, which comprises:

a base layer having a front face and a back face;

said front face of said base layer having printed matter thereon;

a protective clear layer over said front face of said base layer;

removable release liner applied to said back face of said base layer;

a coupon layer having a coupon face and a release liner face;

said coupon face of said coupon layer having coupons printed on it and scored at regular intervals to form a matrix of small adhesive backed removable coupons; and a memory chip or a microprocessor chip adhered to said redemption card.

8. The coupon redemption card as recited in claim 7 further comprising a bar code on said card.

9. The coupon redemption card as recited in claim 7 further comprising a bar code on at least one said peel-off coupon.

10. The coupon redemption card as recited in claim 7 further comprising a magnetic strip on said card.

11. The coupon redemption card as recited in claim 7 further comprising a magnetic strip on at least one said peel-off coupon.

12. The coupon redemption card as recited in claim 7 further comprising:

a magnetic strip on said card; and a bar code on said card.

13. A laminated coupon redemption card, which comprises:

a base layer having a front face and a back face;

said front face of said base layer having printed matter thereon;

a protective clear layer over said front face of said base layer;

removable release liner applied to said back face of said base layer;

a coupon layer having a coupon face and a release liner face;

said coupon face of said coupon layer having coupons printed on it and scored at regular intervals to form a matrix of small adhesive backed removable coupons;

a removable scratch-off layer temporarily covering at least one said peel-off coupon; and a memory chip or a microprocessor chip adhered to said redemption card.

14. The coupon redemption card as recited in claim 7 wherein said coupon card has the overall dimensions of a credit card.

15. The coupon redemption card as recited in claim 7 wherein:

said overall dimensions of said coupon are 1" by $^{13}\!/_{16}$"; and said base layer is fabricated from 6,8,10, or 12 tag paper.

16. A double flap laminated coupon redemption card, which comprises:

a base layer having a front face and a back face;

said front face of said base layer having printed matter thereon;

a protective clear layer over said front face of said base layer;

removable release liner applied to said back face of said base layer;

a coupon layer having a coupon face and a release liner face;

said coupon face of said coupon layer having coupons printed on it and scored at regular intervals to form a matrix of small adhesive backed removable coupons;

said overall dimensions of said coupon are 1" by $^{13}\!/_{16}$";

said base layer is fabricated from 6,8,10, or 12 tag paper;

a double flap coupon redemption card having general overall dimensions of 6⅝" by 2⅜"; and a memory chip or a microprocessor chip adhered to said double flap coupon redemption card.

17. The coupon card as recited in claim 7 further comprising:

tracking sheet means comprising a flat rectangular sheet having overall dimensions sufficiently small to fit into a compartment, or a typical tray in a cash register;

said tracking sheet having a plurality of rectangles, each being slightly larger than each said peel-off coupon of said coupon card for affixing said redeemed coupons from said coupon card and keeping a record of said redeemed coupons on said tracking sheet.

18. The coupon card as recited in claim 11 wherein said base is fabricated from a plastic material, such as PVC or vinyl.

19. A method of presenting an immunization coupon secured to an immunization card and tracking the immunization record of a child, which comprises:

issuing an immunization card that has a memory chip or microprocessor chip, and a series of coupons having bar codes thereon and representing the required vaccination shots needed by a child from birth to teenage years;

periodically vaccinating a child according to the schedule set forth on said immunization card;

presenting to an immunization tracking center the peel-off coupon corresponding to the particular vaccination administered to the child;

placing a tracking means for the child at said immunization tracking center;

transferring said peel-off coupon to said tracking means;

recording the vaccination on said peel-off coupon by reading said bar code on said peel-off coupon with a bar code reader or by reading said memory chip or said microprocessor chip with an electronic reader; and returning said immunization card to the presenter.

20. A laminated hotel casino card, which comprises:

a base layer having a front face and a back face;

said front face of said base layer having printed matter thereon;

a protective clear layer over said front face of said base layer;

removable release liner applied to said back face of said base layer;

a coupon layer having a coupon face and a release liner face;

said coupon face of said coupon layer having coupons printed thereon and scored at regular intervals to form a matrix of small adhesive backed removable coupons;

said peel-off coupons redeemable at said hotel for a variety of gratuities according to what is printed on said peel-off coupon;

a scratch-off layer over at least one coupon on said casino card; and a memory chip or a microprocessor chip adhered to said casino card.

21. The method of making a peel off coupon card, which comprises:

fabricating a base layer having a front face and a back face;

applying an adhesive layer to said back face of said base layer;

applying a coupon layer to said adhesive layer of said base layer;

said base layer, said adhesive layer and said coupon layer being formed as a roll or a sheet;

transferring said sheet or roll to a printing means;

applying printed matter to said coupon layer to form a matrix of coupons;

covering at least one coupon with a removable scratch-off layer;

applying printed matter to said front face of said base layer;

die-cutting from said sheet or roll to form score lines on said coupon layer to allow each said coupon to be individually peeled away from said adhesive layer while leaving a portion of said adhesive to the back of said coupon; and die-cutting said sheet or said roll to form each coupon redemption card separate from the printed sheet or roll; and adhering a memory chip or a microprocessor chip to said peel off coupon card.

22. The method of making a peel off coupon card, which comprises:

fabricating a base layer having a front face and a back face;

applying an adhesive layer to said back face of said base layer;

applying a coupon layer to said adhesive layer of said base layer;

said base layer, said adhesive layer and said coupon layer being formed as a roll or a sheet;

transferring said sheet or roll to a printing means;

applying printed matter to said coupon layer to form a matrix of coupons;

applying printed matter to said front face of said base layer;

applying a protective sealant to said front face of said base layer;

die-cutting from said sheet or roll to form score lines on said coupon layer to allow each said coupon to be individually peeled away from said adhesive layer while leaving a portion of said adhesive on the back of said coupon;

cutting said sheet or said roll to form each coupon card separate from the printed sheet or roll; and adhering a memory chip or a microprocessor chip to said peel off coupon card.

23. The method of making a peel-off coupon card as recited in claim 21 including applying at least one bar code to said card.

24. The method of making a peel-off coupon card as recited in claim 21 including applying at least one magnetic strip to said card.

25. The method of making a peel-off coupon card as recited in claim 21 including applying at least one magnetic strip and at least one bar code to said card.

26. The method of making a peel off coupon card, which comprises:

fabricating a base layer having a front face and a back face;

applying an adhesive layer to said back face of said base layer;

applying a coupon layer to said adhesive layer of said base layer;

said base layer, said adhesive layer and said coupon layer being formed as a roll or a sheet;

transferring said sheet or roll to a printing means;

applying printed matter to said coupon layer to form a matrix of coupons;

applying printed matter to said front face of said base layer;

applying at least one magnetic strip to said card;

die-cutting from said sheet or roll to form score lines on said coupon layer to allow each said coupon to be individually peeled away from said adhesive layer while leaving a portion of said adhesive to the back of said coupon;

die-cutting said sheet or said roll to form each coupon redemption card separate from the printed sheet or roll; and adhering a memory chip or a microprocessor chip to said peel off coupon card.

27. The method of making a peel-off coupon card as recited in claim 26 including applying at least one bar code to said card.

28. The method of making a peel off coupon card, which comprises:

fabricating a base layer having a front face and a back face;

applying an adhesive layer to said back face of said base layer;

applying a coupon layer to said adhesive layer of said base layer;

said base layer, said adhesive layer and said coupon layer being formed as a roll or a sheet;

transferring said sheet or roll to a printing means;

applying printed matter to said coupon layer to form a matrix of coupons;

applying printed matter to said front face of said base layer;

applying at least one bar code to said card;

die-cutting from said sheet or roll to form score lines on said coupon layer to allow each said coupon to be individually peeled away from said adhesive layer while leaving a portion of said adhesive to the back of said coupon;

die-cutting said sheet or said roll to form each coupon redemption card separate from the printed sheet or roll; and adhering a memory chip or a microprocessor chip to said peel off coupon card.

29. The coupon card as recited in claim 7 wherein said base is fabricated from a plastic material, such as PVC or vinyl.

30. The coupon card as recited in claim 8 wherein said base is fabricated from a plastic material, such as PVC or vinyl.

31. The coupon card as recited in claim 9 wherein said base is fabricated from a plastic material, such as PVC or vinyl.

32. The coupon card as recited in claim 10 wherein said base is fabricated from a plastic material, such as PVC or vinyl.

33. The coupon card as recited in claim 11 wherein said base is fabricated from a plastic material, such as PVC or vinyl.

34. The coupon card as recited in claim 12 wherein said base is fabricated from a plastic material, such as PVC or vinyl.

35. The coupon card as recited in claim 13 wherein said base is fabricated from a plastic material, such as PVC or vinyl.

36. The coupon card as recited in claim 14 wherein said base is fabricated from a plastic material, such as PVC or vinyl.

37. A laminated hotel casino card, which comprises:

a base layer having a front face and a back face;

said front face of said base layer having printed matter thereon;

a protective clear layer over said front face of said base layer.

removable release liner applied to said back face of said base layer;

a coupon layer having a coupon face and a release liner face;

said coupon face of said coupon layer having coupons printed thereon and scored at regular intervals to form a matrix of small adhesive backed removable coupons;

said peel-off coupons redeemable at said hotel for a variety of gratuities according to what is printed on said peel-off coupon; and a memory chip or a microprocessor chip adhered to said casino card.

38. The casino card as recited in claim 37 wherein said base is fabricated from a plastic material, such as PVC or vinyl.

39. The casino card as recited in claim 20 wherein said base is fabricated from a plastic material, such as PVC or vinyl.

40. An immunization card, which comprises:

a base layer having a front face and a back face;

said front face of said base layer having printed matter thereon;

removable release liner applied to said back face of said base layer;

a coupon layer having a coupon face and a release liner face;

said coupon face of said coupon layer having a series of coupons thereon representing the vaccination shots needed by a child from birth to teenage years;

said coupon face scored at regular intervals to form a matrix of small adhesive backed removable coupons; and a memory chip or a microprocessor chip adhered to said immunization card.

41. A method of redeeming a coupon secured to a redemption card which comprises:

presenting to a redemption center a redemption card having a memory chip or microprocessor chip, and containing at least one peel-off coupon;

peeling off at least one said peel-off coupon from said redemption card;

transferring said peel-off coupon to a tracking means;

crediting the value of said peel-off coupon to the redeemer;

returning said redemption card to the redeemer.

42. The method of making a peel off coupon card, which comprises:

fabricating a base layer having a front face and a back face;

applying an adhesive layer to said back face of said base layer;

applying a coupon layer to said adhesive layer of said base layer;

said base layer, said adhesive layer and said coupon layer being formed as a roll or a sheet;

transferring said sheet or roll to a printing means;

applying printed matter to said coupon layer to form a matrix of coupons;

applying printed matter to said front face of said base layer;

laminating a clear protective sheet of plastic to said front face of said base layer;

die-cutting from said sheet or roll to form score lines on said coupon layer to allow each said coupon to be individually peeled away from said adhesive layer while leaving a portion of said adhesive to the back of said coupon;

die-cutting said sheet or said roll to form each coupon redemption card separate from the printed sheet or roll; and adhering a memory chip or a microprocessor chip to said peel off coupon card.

43. The method of making a peel-off coupon card as recited in claim 42 including applying at least one bar code to said card.

44. The method of making a peel-off coupon card as recited in claim 42 including applying at least one magnetic strip to said card.

45. The method of making a peel-off coupon card as recited in claim 41 including applying a scratch off layer to at least one said coupon.

46. A four-layer laminated coupon redemption card, which comprises:

a base layer having a front face and a back face;

said front face and said back face of said base layer having printed matter thereon;

a protective clear layer over said front face of said base layer;

clear liner layer applied to said back face of said base layer;

a coupon layer having a coupon face and an adhesive back for adhering to said clear liner; and said coupon face of said coupon layer having coupons printed on it and kiss cut at regular intervals to form a matrix of small adhesive backed removable coupons.

47. The four-layer laminated coupon card as recited in claim 46 further comprising a memory chip or a microprocessor adhered to said card.

48. The four-layer laminated coupon card as recited in claim 46 further comprising a bar code on said card.

49. The coupon card as recited in claim 46 further comprising a bar code on at least one said peel-off coupon.

50. The coupon card as recited in claim 46 further comprising a magnetic strip on said card.

51. The coupon card as recited in claim 46 further comprising a magnetic strip on at least one said peel-off coupon.

52. The coupon card as recited in claim 46 further comprising:

a magnetic strip on said card; and a bar code on said card.

53. The coupon card as recited in claim 46 further comprising a scratch off layer applied to at least on peel off coupon.

54. The coupon card as recited in claim 42 further comprising a magnetic strip on said card and a bard code on said card.

* * * * *